United States Patent
Noda

(10) Patent No.: US 10,319,955 B2
(45) Date of Patent: Jun. 11, 2019

(54) POWER STORAGE DEVICE AND ELECTRONIC DEVICE

(71) Applicant: SEMICONDUCTOR ENERGY LABORATORY CO., LTD., Atsugi-shi, Kanagawa-ken (JP)

(72) Inventor: Kosei Noda, Mie (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 277 days.

(21) Appl. No.: 15/176,350

(22) Filed: Jun. 8, 2016

(65) Prior Publication Data
US 2016/0372717 A1 Dec. 22, 2016

(30) Foreign Application Priority Data
Jun. 16, 2015 (JP) .................. 2015-120997

(51) Int. Cl.
*H01M 6/46* (2006.01)
*H01M 2/02* (2006.01)
(Continued)

(52) U.S. Cl.
CPC ......... *H01M 2/026* (2013.01); *H01M 2/0207* (2013.01); *H01M 2/0275* (2013.01);
(Continued)

(58) Field of Classification Search
CPC .. H01M 2/026; H01M 2/0207; H01M 2/0275; H01M 2/0287; H01M 2/06;
(Continued)

(56) References Cited

U.S. PATENT DOCUMENTS 4,992,910 A * 2/1991 Evans .................. H01G 9/12
361/502
6,461,762 B1 10/2002 Yang et al.
(Continued)

FOREIGN PATENT DOCUMENTS

CN 001547782 A 11/2004
CN 103259049 A 8/2013
(Continued)

OTHER PUBLICATIONS

Yotaro Murakami, "Marvelous Metal Material "Gum Metal"", NMC News No. 8 (7), Jul. 1, 2004.
(Continued)

*Primary Examiner* — Jane J Rhee
(74) *Attorney, Agent, or Firm* — Nixon Peabody LLP; Jeffrey L. Costellia

(57) ABSTRACT

A power storage device with high capacity per unit volume, a flexible power storage device with a novel structure, a repeatedly bendable power storage device, a highly reliable power storage device, or a long-life power storage device is provided. The power storage device includes an inner structure and an exterior body surrounding the inner structure. The inner structure includes a positive electrode and a negative electrode. The exterior body includes a first film containing titanium and one or more elements selected from niobium, tantalum, vanadium, zirconium, and hafnium. It is preferable that the first film further contain one or more elements selected from molybdenum, chromium, and aluminum.

23 Claims, 23 Drawing Sheets

(51) Int. Cl.
  *H01M 2/06* (2006.01)
  *H01M 10/04* (2006.01)
(52) U.S. Cl.
  CPC .......... *H01M 2/0287* (2013.01); *H01M 2/06* (2013.01); *H01M 10/0436* (2013.01); *H01M 2/0212* (2013.01); *H01M 10/0459* (2013.01); *H01M 2220/30* (2013.01)
(58) Field of Classification Search
  CPC .......... H01M 2/0212; H01M 10/0436; H01M 10/0459; H01M 2220/30
  See application file for complete search history.

(56) References Cited

U.S. PATENT DOCUMENTS

| | | |
|---|---|---|
| 2003/0039883 A1 | 2/2003 | Notten et al. |
| 2003/0118900 A1 | 6/2003 | Otohara |
| 2013/0224562 A1* | 8/2013 | Momo .............. H01M 10/0436 429/149 |
| 2014/0342219 A1 | 11/2014 | Takahashi |

FOREIGN PATENT DOCUMENTS

| | | | |
|---|---|---|---|
| EP | 1421636 | A | 5/2004 |
| JP | 2003-187762 | A | 7/2003 |
| JP | 2005-501385 | | 1/2005 |
| JP | 2012178350 | A * | 9/2012 |
| JP | 2013-191548 | A | 9/2013 |
| JP | 2013-211262 | A | 10/2013 |
| JP | 2014-241283 | A | 12/2014 |
| KR | 10-0936411 | | 1/2010 |
| TW | I233229 | | 5/2005 |
| WO | WO-2003/019698 | | 3/2003 |

OTHER PUBLICATIONS

International Search Report (Application No. PCT/IB2016/053316) dated Oct. 11, 2016.
Written Opinion (Application No. PCT/IB2016/053316) dated Oct. 11, 2016.

* cited by examiner

FIG. 14A
FIG. 14B
FIG. 14C
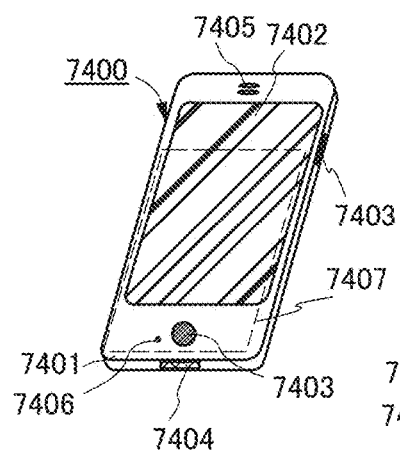
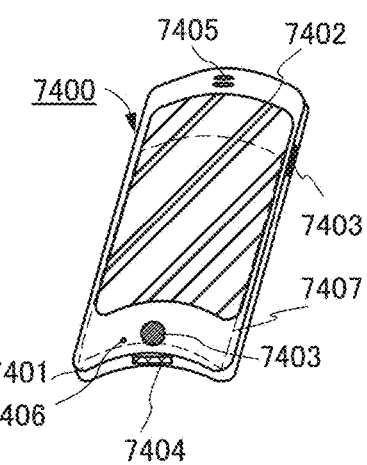
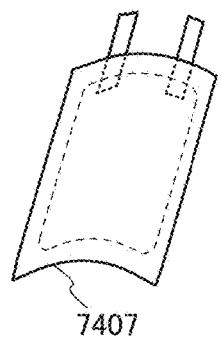
FIG. 14D
FIG. 14E
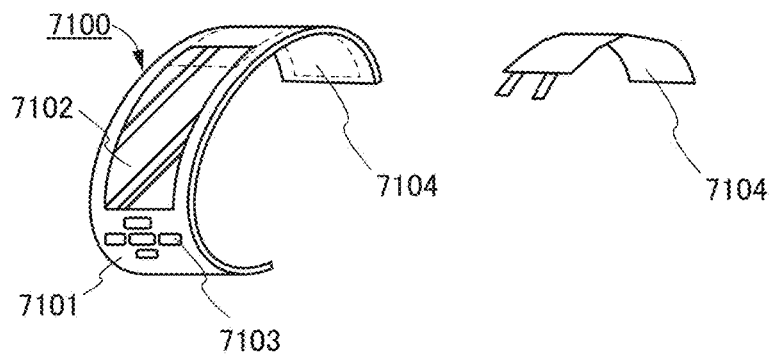

POWER STORAGE DEVICE AND ELECTRONIC DEVICE

TECHNICAL FIELD

The present invention relates to an object, a method, or a manufacturing method. The present invention relates to a process, a machine, manufacture, or a composition of matter. One embodiment of the present invention particularly relates to a semiconductor device, a display device, a light-emitting device, a power storage device, an imaging device, a driving method thereof, or a manufacturing method thereof. One embodiment of the present invention particularly relates to a power storage device and a method for manufacturing a power storage device.

BACKGROUND ART

In recent years, wearable devices have been under active development. Since wearable devices are worn on one's body, it is preferable that they have shapes curved along a curved surface of the body or they be curved according to the movement of the body. Therefore, it is preferable that a power storage device used in a wearable device also have flexibility like displays and other housings.

Furthermore, the hermeticity of an exterior body of a power storage device should be high. For example, Patent Document 1 discloses an example of a power storage device having a laminate exterior body with high hermeticity.

REFERENCE

[Patent Document 1] Japanese Published Patent Application No. 2003-187762

DISCLOSURE OF INVENTION

An object of one embodiment of the present invention is to provide a power storage device with high capacity per unit volume. Another object of one embodiment of the present invention is to provide a flexible power storage device with a novel structure. Another object of one embodiment of the present invention is to provide a repeatedly bendable power storage device. Another object of one embodiment of the present invention is to provide a highly reliable power storage device. Another object of one embodiment of the present invention is to provide a long-life power storage device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In the case of manufacturing a flexible power storage device or a bent power storage device, a film in an exterior body (hereinafter referred to as an exterior film) on the side closer to a center of curvature and an exterior film on the side farther from the center of curvature are bent with different radii of curvature. By the difference in radius of curvature, tensile stress is applied to the exterior film on the side farther from the center of curvature, and compressive stress is applied to the exterior film on the side closer to the center of curvature.

In particular, an exterior film of a power storage device that has flexibility and is intended for use with repeated bending is subjected to repeated stress, leading to a fatigue fracture in some cases.

The exterior film of the power storage device needs to block moisture or a gas such as oxygen from the outside. A laminate film including metal foil is used as the exterior film in some cases, in which case a crack might be made due to metal fatigue caused by repeated bending. In the case where the crack is large and deep, barrier performance of the exterior film is damaged, leading to deterioration of the performance of the power storage device.

In one embodiment of the present invention, because a barrier layer containing titanium is formed in the exterior body of the power storage device, sufficient barrier properties can be kept even when an exterior film is changed in shape by application of an external force.

One embodiment of the present invention is a power storage device including an inner structure and an exterior body that surrounds the inner structure. The inner structure includes a positive electrode and a negative electrode. The exterior body includes a first film containing titanium (Ti) and one or more elements selected from niobium (Nb), tantalum (Ta), vanadium (V), zirconium (Zr), and hafnium (Hf).

In the power storage device of one embodiment of the present invention, the first film may further contain one or more elements selected from molybdenum (Mo), chromium (Cr), and aluminum (Al).

In the power storage device of one embodiment of the present invention, the exterior body may include a second film in contact with the first film, and the second film may contain an organic material.

In the power storage device of one embodiment of the present invention, the first film may include a region with a thickness of more than or equal to 10 μm and less than or equal to 150 μm.

In the power storage device of one embodiment of the present invention, the exterior body may include a third film in contact with the first film, the third film may contain an organic material, and the first film may be between the second film and the third film.

In the power storage device of one embodiment of the present invention, the first film may include a region with a density of more than or equal to 5 $g/cm^3$ and less than or equal to 6 $g/cm^3$.

In the power storage device of one embodiment of the present invention, the exterior body may be flexible.

One embodiment of the present invention is an electronic device including the above-described power storage device, a display, and an operation button.

According to one embodiment of the present invention, a power storage device with high capacity per unit volume can be provided. According to one embodiment of the present invention, a flexible power storage device with a novel structure can be provided. According to one embodiment of the present invention, a power storage device that can be bent repeatedly can be provided. According to one embodiment of the present invention, a highly reliable power storage device can be provided. According to one embodiment of the present invention, a long-life power storage device can be provided.

Note that the descriptions of these effects do not disturb the existence of other effects. One embodiment of the present invention does not necessarily achieve all the effects. Other effects will be apparent from and can be derived from the description of the specification, the drawings, the claims, and the like.

BRIEF DESCRIPTION OF DRAWINGS

FIGS. 14A to 14E illustrate examples of storage batteries and electronic devices.

FIGS. 17A, 17B, 17C1, 17C2, and 17D are a perspective view, a top view, and cross-sectional views illustrating a structural example of a storage battery.

BEST MODE FOR CARRYING OUT THE INVENTION

Figure 1A:
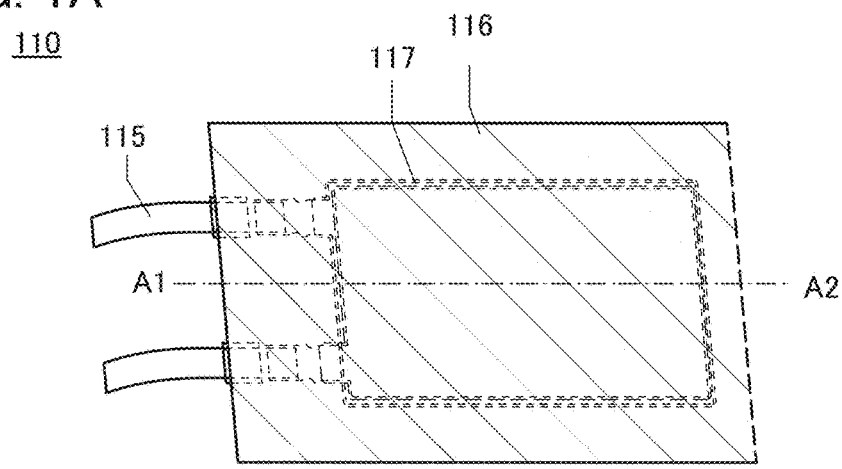
FIGS. 1A to 1C illustrate a power storage device.

Embodiments of the present invention will be described in detail below with reference to the drawings. However, the present invention is not limited to the description below, and it is easily understood by those skilled in the art that modes and details disclosed herein can be modified in various ways. Furthermore, the present invention is not construed as being limited to the description of the embodiments.

The position, size, range, and the like of each component illustrated in the drawings and the like are not accurately represented in some cases to facilitate understanding. Therefore, the disclosed invention is not necessarily limited to the position, size, range, and the like disclosed in the drawings and the like.

The term "electrically connected" includes the case where components are connected through an "object having any electric function." There is no particular limitation on the "object having any electric function" as long as electric signals can be transmitted and received between components that are connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In the structures of the present invention described in this specification and the like, the same portions or portions having similar functions in different drawings are denoted by the same reference numerals, and description of such portions is not repeated.

Ordinal numbers such as "first," "second," and "third" in this specification and the like are used for convenience and do not denote the order of steps, the vertical positional relationship, and the like. Therefore, for example, the term "first" can be replaced with the term "second," "third," or the like as appropriate. In addition, the ordinal numbers in this specification and the like are not necessarily the same as the ordinal numbers used to specify one embodiment of the present invention.

In this specification, flexibility refers to a property of an object being flexible and bendable. In other words, it is a property of an object that can be changed in shape in response to an external force applied to the object, and elasticity or restorability to the former shape is not taken into consideration. A power storage device having flexibility, i.e., a flexible power storage device, can be changed in shape in response to an external force. A flexible power storage device can be used with its shape fixed in a state of being changed in shape, can be used while repeatedly changed in shape, or can be used in a state of not being changed in shape. In this specification and the like, the inside of an exterior body refers to a region surrounded by (or covered with) the exterior body of the power storage device, in which a structure such as a positive electrode, a negative electrode, an active material layer, and a separator, and an electrolytic solution are included.

In this specification and the like, the term "power storage device" may be replaced with the term "storage battery" or the like.

The descriptions in embodiments for carrying out the present invention can be combined with each other as appropriate.

Embodiment 1

In this embodiment, a power storage device 110 of one embodiment of the present invention and a manufacturing method thereof are described.

Figure 1B:
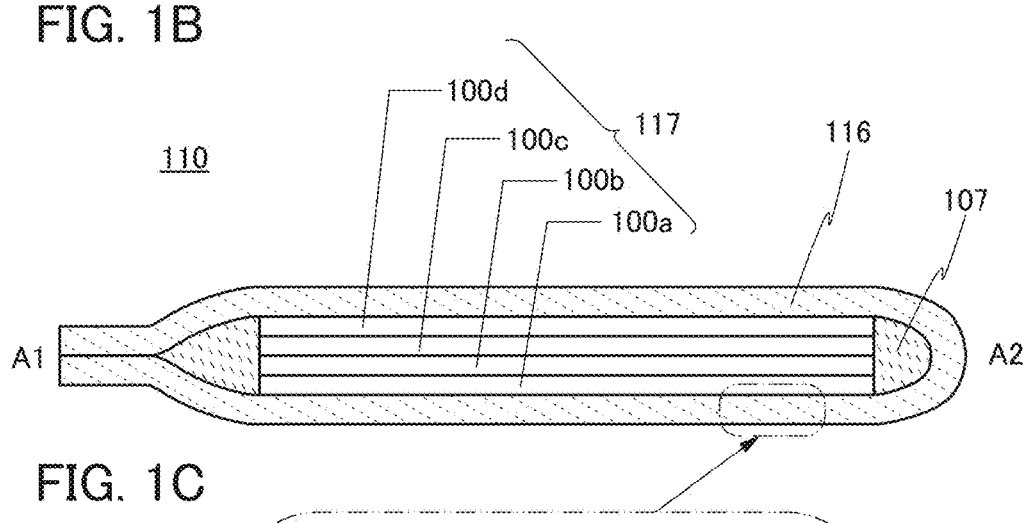
Figure 1C:
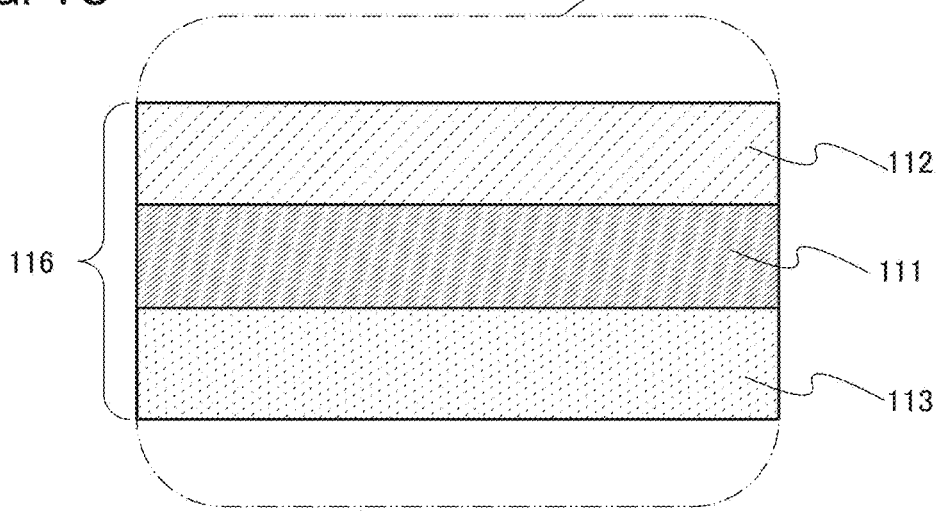

FIGS. 1A to 1C illustrate the power storage device 110. The power storage device 110 in FIG. 1A includes an inner structure 117 surrounded by an exterior body 116. The inner structure 117 includes an electrode and a separator, and the electrode is electrically connected to a lead electrode 115.

FIG. 1B is a cross-sectional view of the power storage device 110 taken along line A1-A2 in FIG. 1A. FIG. 1C is an enlarged view of the exterior body 116.

As illustrated in FIG. 1B, the power storage device 110 has a structure in which the inner structure 117 and an electrolytic solution 107 are surrounded by the exterior body 116. The inner structure 117 includes a first stack 100a, a second stack 100b, a third stack 100c, and a fourth stack 100d. Note that the number of stacks included in the power storage device 110 of this embodiment is mainly, but not limited to, four.

As illustrated in FIG. 1C, the exterior body 116 includes a film 112, a film 113, and a film 111 between the film 112 and the film 113.

The film 111 contains titanium and one or more elements selected from niobium, tantalum, vanadium, zirconium, and hafnium. It is preferable that the film 111 further contain one or more elements selected from molybdenum, chromium, and aluminum. When containing titanium and any of the above elements, the film 111 can have a low Young's modulus and a high strength. This can reduce a fracture of the exterior body due to a change in shape by repeated bending.

The film 111 containing titanium is preferably used in an exterior body of a power storage device as described in this embodiment because, in the case where the power storage device is placed so as to be in direct contact with a human body, for example, a metal allergy reaction can be suppressed as compared with the case where a film containing another metal is used in the exterior body. The use of the film 111 containing titanium is also preferable in the case where the power storage device is placed inside a human body or the like.

The film 111 includes a region with a thickness of more than or equal to 10 µm and less than or equal to 150 µm. This enables the film 111 to have flexibility.

The film 111 includes a region with a density of more than or equal to 5 g/cm$^3$ and less than or equal to 6 g/cm$^3$. This makes it possible to block moisture or a gas such as oxygen from the outside and also to prevent a fracture due to a change in shape by repeated bending or the like.

The film 111 can be formed using an alloy of titanium and one or more elements selected from niobium, tantalum, vanadium, zirconium, and hafnium. For example, Ti—Nb—Ta—Zr—O, Ti—Ta—Nb—V—Zr—O, or the like may be used. In that case, the film 111 can have a 0.2% proof stress. For example, the film 111 has a 0.2% proof stress of more than or equal to 900 MPa and less than or equal to 1700 MPa. Note that the term "0.2% proof stress" refers to a stress which produces a permanent strain of 0.2% when the load is removed after the stress is applied.

The film 111 has ductility or malleability, which prevents the film 111 from being easily fractured and thus enables the film 111 to maintain a gas barrier property even when the film 111 is changed in shape by bending or the like.

The film 112 and the film 113 preferably contain an organic material. This enables the film 111 to have flexibility.

A flexible power storage device can be manufactured with the use of an exterior body including the above films.

Figure 2A:
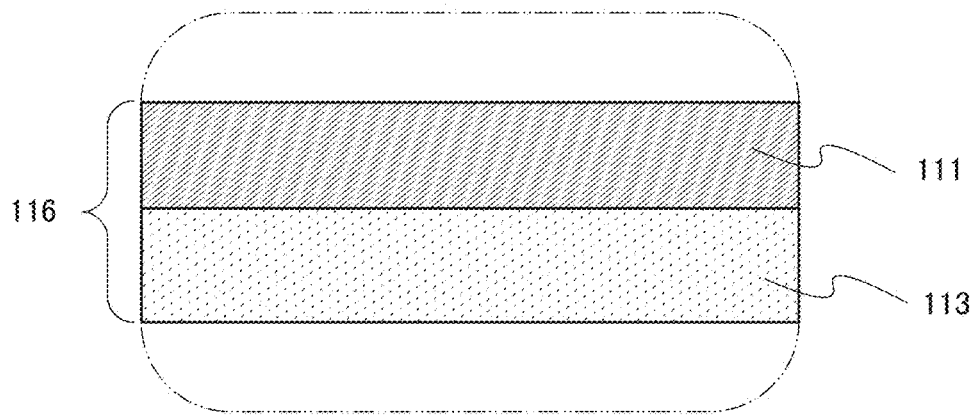
FIGS. 2A to 2C each illustrate a power storage device.
Figure 2B:
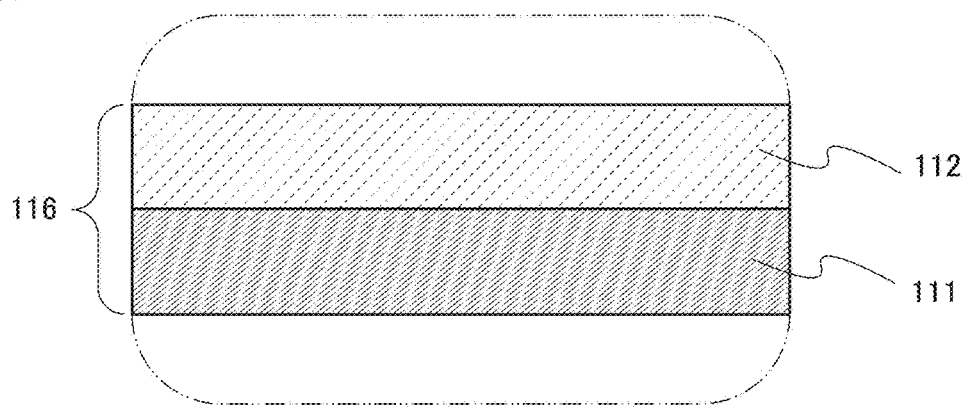
Figure 2C:
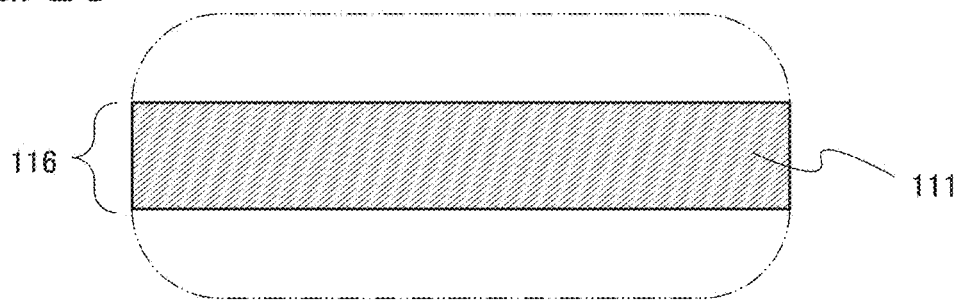

The film 112 or the film 113 is not necessarily included in the exterior body 116. For example, the exterior body 116 without the film 112 may be employed as illustrated in FIG. 2A. The exterior body 116 without the film 113 may be employed as illustrated in FIG. 2B. Furthermore, the exterior body 116 with neither the film 112 nor the film 113 may be employed as illustrated in FIG. 2C.

Each of the films 111, 112, and 113 may be a single-layer film, or may include two or more layers.

The density of the film 111 may be measured by Rutherford backscattering spectrometry (RBS) or X-ray reflection (XRR), for example.

Figure 3A:
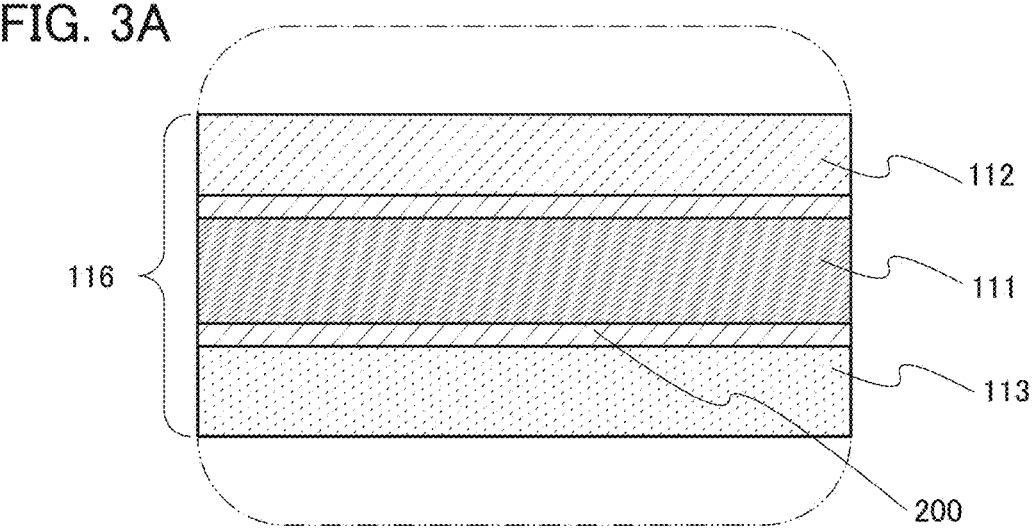
FIGS. 3A to 3C each illustrate a power storage device.
Figure 3B:
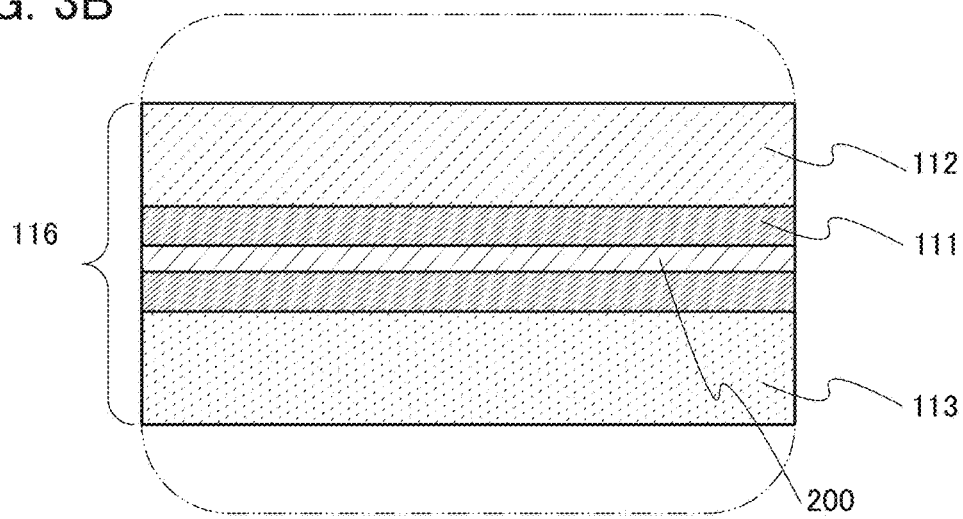
Figure 3C:
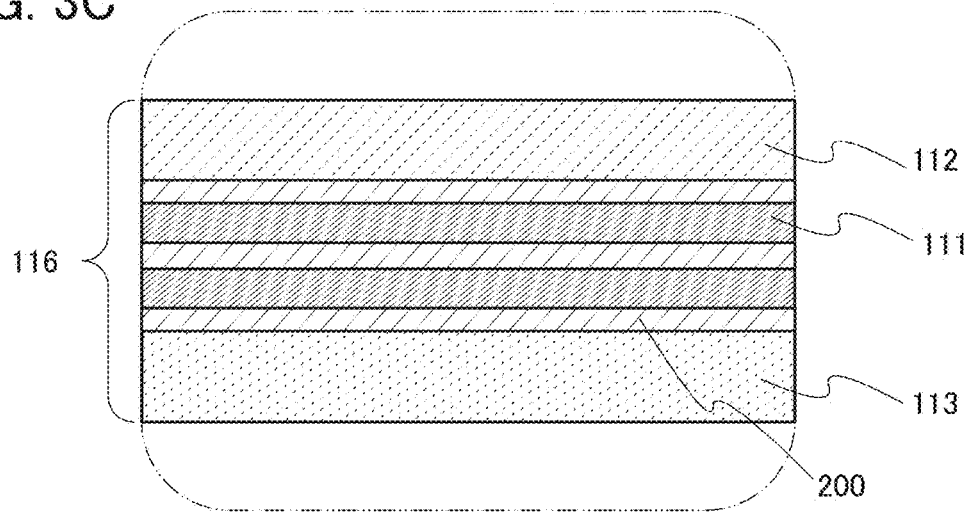

Furthermore, as illustrated in FIGS. 3A to 3C, a highly flexible thin film 200 of aluminum, stainless steel, copper, nickel, or the like may be provided. The thin film 200 may contain a graphene compound.

In this specification and the like, a compound including graphene as a basic skeleton is referred to as a graphene compound. Note that graphene has carbon atoms arranged in one atomic layer. A π bond exists between the carbon atoms. In addition, graphene is one of graphene compounds.

Graphene compounds are detailed below.

Among graphene compounds, those with two to a hundred layers of graphene are referred to as multilayer graphene in some cases. Graphene and multilayer graphene have a length in the longitudinal direction of greater than or equal to 50 nm and less than or equal to 100 µm or greater than or equal to 800 nm and less than or equal to 50 µm.

A graphene compound may be a compound where graphene or multilayer graphene is modified with an atom other than carbon or an atomic group containing atoms other than carbon. A graphene compound may be a compound where graphene or multilayer graphene is modified with an atomic group composed mainly of carbon, such as an alkyl group. Note that the atom or the atomic group with which graphene or multilayer graphene is modified is sometimes referred to as a substituent group, a functional group, a characteristic group, or the like. Here, graphene compounds include the above-mentioned graphene modified with an atom or an atomic group.

The front and rear surfaces of a graphene compound may be modified with different atoms or atomic groups. When a graphene compound includes multilayer graphene, a plurality of pieces of graphene, a plurality of pieces of multilayer graphene, or the like, those layers may be modified with different atoms or atomic groups.

An example of the above-mentioned graphene modified with an atomic group is graphene or multilayer graphene modified with oxygen or a substituent, a functional group, or a characteristic group containing oxygen. Examples of functional groups containing oxygen include an epoxy group, a carbonyl group such as a carboxyl group, and a hydroxyl group. Graphene modified with oxygen or an atomic group containing oxygen is referred to as graphene oxide in some cases.

A graphene compound may have a sheet-like shape where a plurality of graphene compounds overlap each other. Such a graphene compound is referred to as a graphene compound sheet in some cases. The graphene compound sheet includes, for example, a region with a thickness of more than or equal to 0.33 nm and less than or equal to 50 µm, or preferably more than 0.34 nm and less than or equal to 10 µm. The graphene compound sheet may be modified with an atom other than carbon, an atomic group containing atoms other than carbon, an atomic group mainly composed of carbon such as an alkyl group, or the like. A plurality of layers in the graphene compound sheet may be modified with different atoms or atomic groups.

A graphene compound may have a six-membered ring composed of carbon atoms, a five-membered ring composed of carbon atoms, or a poly-membered ring which is a seven or more-membered ring composed of carbon atoms. In the neighborhood of a poly-membered ring except a six-membered ring, a region through which a lithium ion can pass may be generated.

FIG. 3A illustrates a structure in which the film 111 is sandwiched between the thin films 200. FIG. 3B illustrates a structure in which the thin film 200 is sandwiched between the films 111. As illustrated in FIG. 3C, a structure such as a combination of the structure in FIG. 3A with that in FIG. 3B may be employed. Furthermore, the numbers of stacked thin films 200 and films 111 may be increased.

Figure 4A:
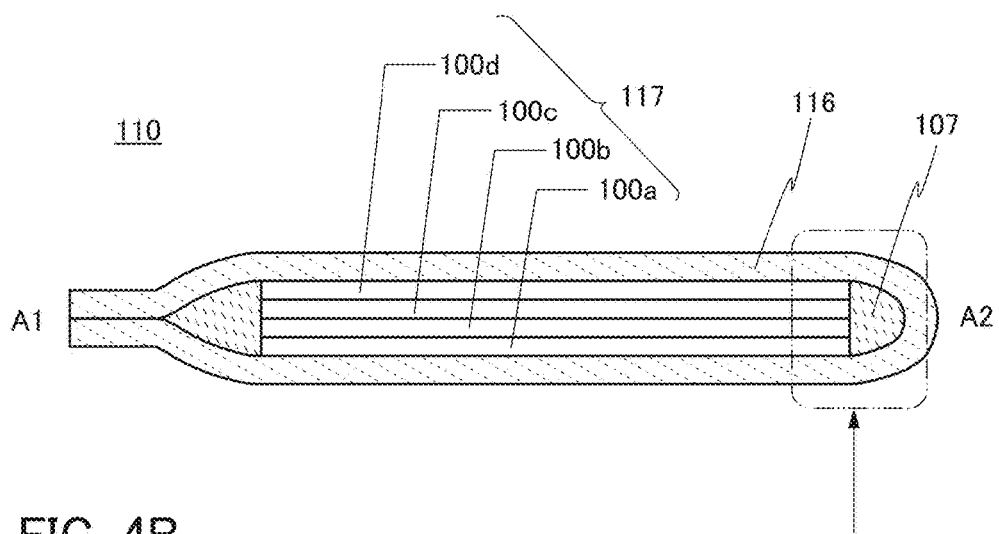
FIGS. 4A and 4B illustrate a power storage device.
Figure 4B:
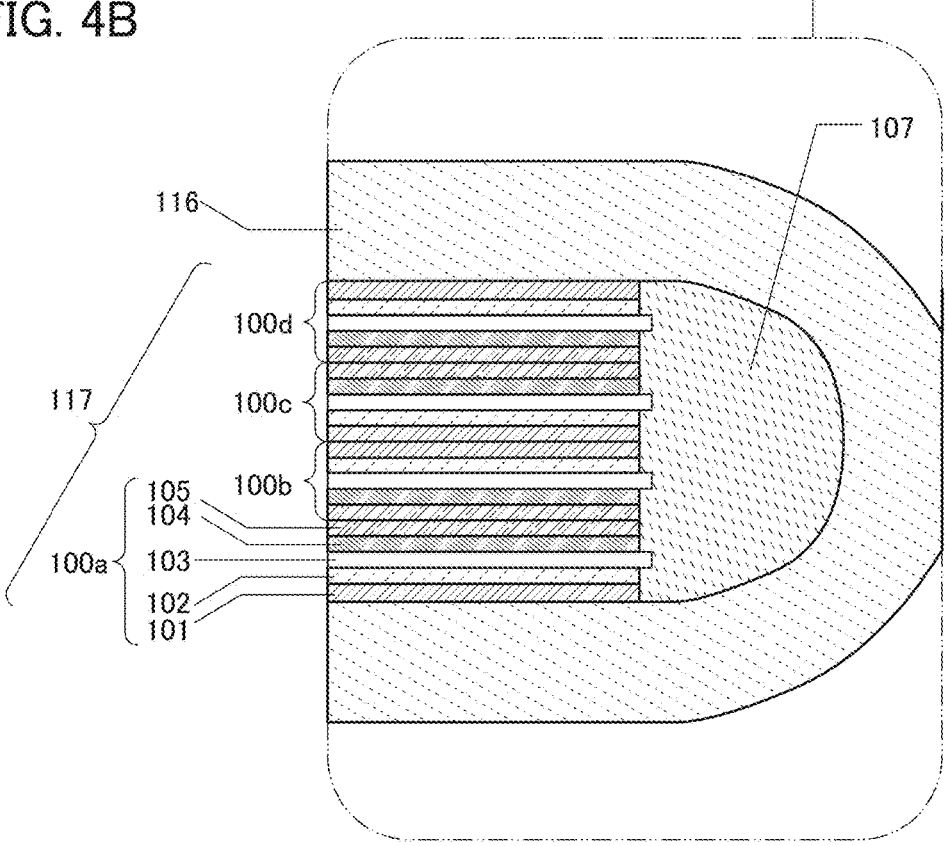

FIG. 4A illustrates a cross-sectional view taken along line A1-A2 in FIG. 1A, and FIG. 4B illustrates an enlarged view of an end portion of the inner structure 117. As illustrated in FIG. 4B, each stack in the inner structure 117 includes a negative electrode current collector 101, a negative electrode active material layer 102, a separator 103, a positive electrode active material layer 104, and a positive electrode current collector 105.

As illustrated in the enlarged view in FIG. 4B, in the power storage device 110, the same layers are stacked in the first to fourth stacks 100a to 100d; however, the stacking order of the layers is alternately reversed in the stacks. The same layers are not necessarily stacked in the stacks.

In the power storage device 110, a surface of the positive electrode current collector of the first stack 100a on which the positive electrode active material layer is not provided is in contact with a surface of the positive electrode current collector of the second stack 100b on which the positive electrode active material layer is not provided; a surface of the negative electrode current collector of the second stack 100b on which the negative electrode active material layer is not provided is in contact with a surface of the negative electrode current collector of the third stack 100c on which the negative electrode active material layer is not provided; and a surface of the positive electrode current collector of the third stack 100c on which the positive electrode active material layer is not provided is in contact with a surface of the positive electrode current collector of the fourth stack 100d on which the positive electrode active material layer is not provided. However, the power storage device 110 of one embodiment of the present invention is not limited to the structure in which the current collector of each stack is in contact with the current collector of the adjacent stack. Furthermore, both sides of each of the positive and negative electrode current collectors may be provided with active material layers.

Figure 5A:
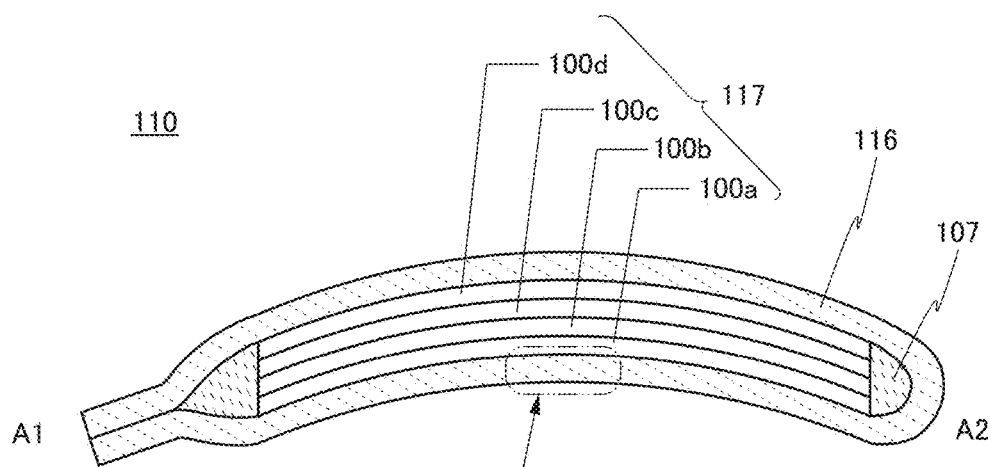
FIGS. 5A and 5B illustrate a power storage device.
Figure 5B:
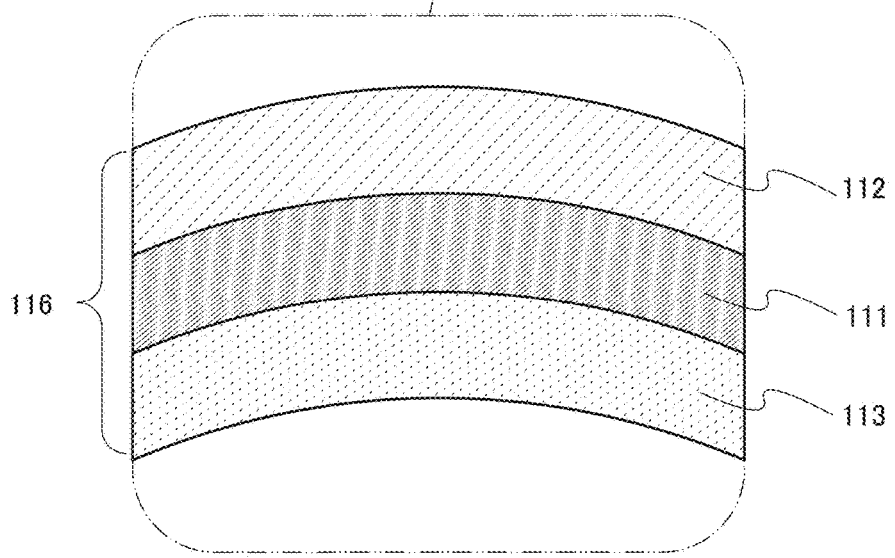

The power storage device 110 of one embodiment of the present invention is flexible and can be changed into various shapes. For example, the power storage device 110 can be bent as illustrated in FIG. 5A. In that case, as illustrated in the enlarged view of the exterior body 116 in FIG. 5B, each of the films 111, 112, and 113 has flexibility.

Figure 6A:
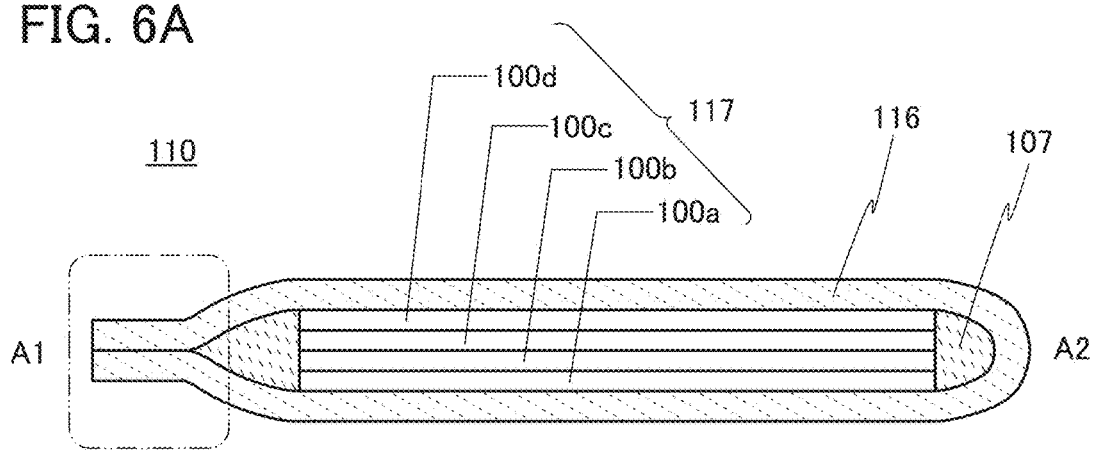
FIGS. 6A to 6C illustrate power storage devices.
Figure 6B:
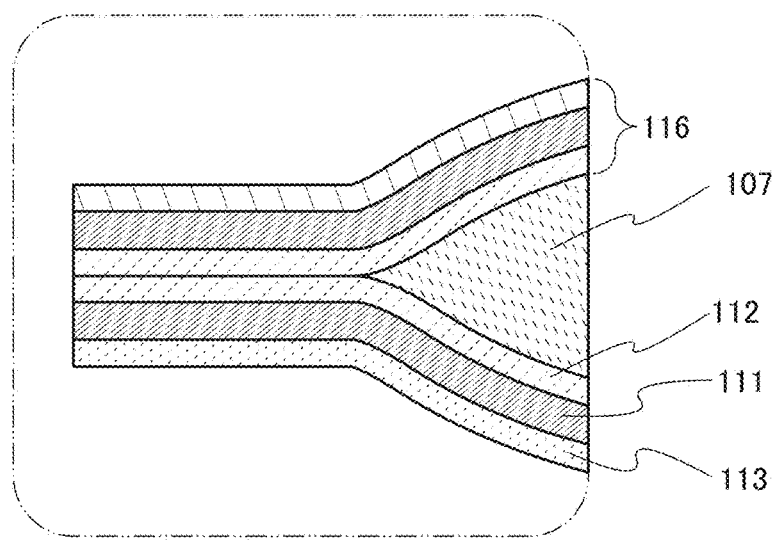
Figure 6C:
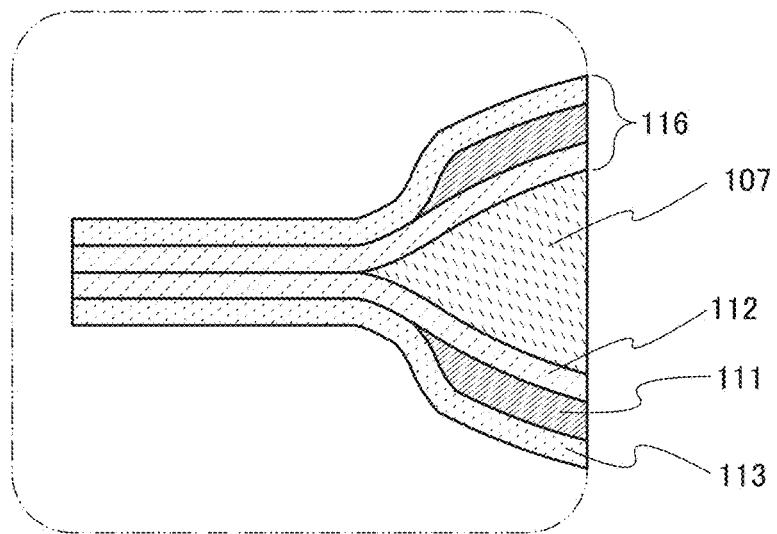

FIGS. 6B and 6C each illustrate an enlarged view of a portion surrounded by a dashed-two dotted line where parts of the exterior body 116 are in contact with each other in the power storage device 110 in FIG. 6A.

As illustrated in FIG. 6B, a structure may be employed in which the film 111 is provided in the entire exterior body 116. Alternatively, as illustrated in FIG. 6C, a structure may be employed in which the film 111 is not provided in part of the exterior body 116.

Figure 7A:
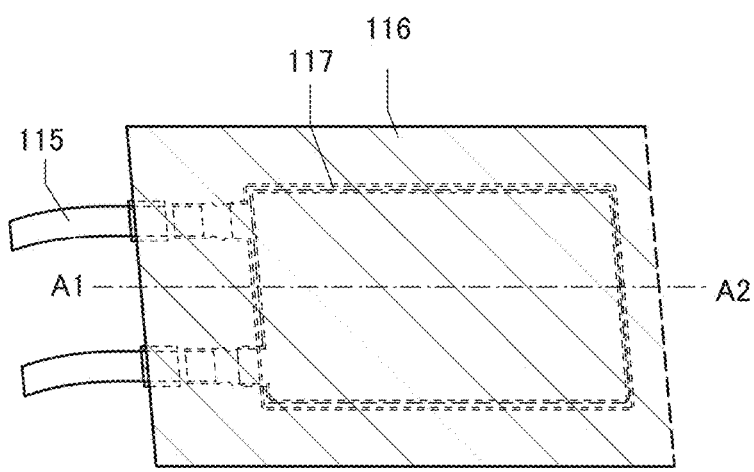
FIGS. 7A and 7B illustrate a power storage device.
Figure 7B:
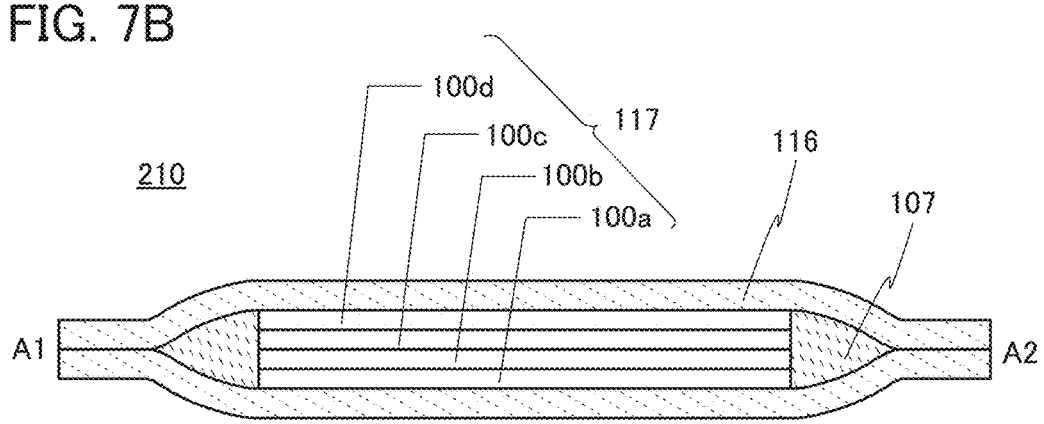

FIGS. 7A and 7B illustrate a power storage device 210 which includes an exterior body 116 having a structure different from that in FIGS. 1A to 1C. FIG. 7B illustrates a cross-sectional view of the power storage device 210 taken along line A1-A2 in FIG. 7A. The power storage device 210 differs from the power storage device 110 in FIGS. 1A to 1C in including two stacked exterior bodies 116.

Next, the power storage device of one embodiment of the present invention is described.

<Structure of Positive Electrode>

First, the positive electrode is described. The positive electrode includes the positive electrode active material layer 104 and the positive electrode current collector 105, as illustrated in FIG. 4B.

As a material for a positive electrode active material used for the positive electrode active material layer 104, a material in which carrier ions such as lithium ions can transfer can be used. Examples thereof include lithium-containing materials with an olivine crystal structure, a layered rock-salt crystal structure, and a spinel crystal structure.

Typical examples of the lithium-containing material with an olivine crystal structure (represented by a general formula, $LiMPO_4$ (M is Fe(II), Mn(II), Co(II), or Ni(II)) include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charging).

Examples of the lithium-containing material with a layered rock-salt crystal structure include a lithium-containing material such as lithium cobalt oxide ($LiCoO_2$), $LiNiO_2$, $LiMnO_2$, or $Li_2MnO_3$; an NiCo-based lithium-containing material (a general formula thereof is $LiNi_xCo_{1-x}O_2$ (0<x<1)) such as $LiNi_{0.8}CO_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y>0, x+y<1)) such as $LiNi_{1/3}Mn_{1/3}CO_{1/3}O_2$. The examples further include $Li(Ni_{0.8}Co_{0.15}Al_{0.05})O_2$ and $Li_2MnO_3$—$LiMO_2$ (M is Co, Ni, or Mn).

In particular, $LiCoO_2$ is preferable because it has advantages such as high capacity, higher stability in the air than that of $LiNiO_2$, and higher thermal stability than that of $LiNiO_2$.

Examples of the lithium-containing material with a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$.

It is preferable to add a small amount of lithium nickel oxide ($LiNiO_2$ or $LiNi_{1-x}M_xO_2$ (0<x<1) (M is Co, Al, or the like)) to a lithium-containing material with a spinel crystal structure which contains manganese such as $LiMn_2O_4$ because advantages such as inhibition of the dissolution of manganese and the decomposition of an electrolytic solution can be obtained.

Alternatively, a composite oxide represented by a general formula, $Li_{(2-j)}MSiO_4$ (M is Fe(II), Mn(II), Co(II), or Ni(II)) (0≤j≤2), can be used as the positive electrode active material. Typical examples of $Li_{(2-j)}MSiO_4$ (general formula) include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula, $A_xM_2(XO_4)_3$ (A is Li, Na, or Mg) (M is Fe, Mn, Ti, V, Nb, or Al) (X is S, P, Mo, W, As, or Si), can be used as the positive electrode active material. Examples of the NASICON compound include $Fe_2(MnO_4)_3$, $Fe_2(SO_4)_3$, and $Li_3Fe_2(PO_4)_3$. Still further alternatively, a compound represented by a general formula, $Li_2MPO_4F$, $Li_2MP_2O_7$, or $Li_5MO_4$ (M is Fe or Mn), a perovskite fluoride such as $NaFeF_3$ or $FeF_3$, a metal chalcogenide (a sulfide, a selenide, or a telluride) such as $TiS_2$ or $MoS_2$, a lithium-containing material with an inverse spinel crystal structure such as $LiMVO_4$, a vanadium oxide (e.g., $V_2O_5$, $V_6O_{13}$, or $LiV_3O_8$), a manganese oxide, or an organic sulfur can be used as the positive electrode active material, for example.

In the case where carrier ions are alkali metal ions other than lithium ions or alkaline-earth metal ions, the following may be used as the positive electrode active material: a compound or an oxide which is obtained by substituting an alkali metal (e.g., sodium or potassium) or an alkaline-earth metal (e.g., calcium, strontium, barium, beryllium, or magnesium) for lithium in any of the above-mentioned compounds or oxides. For example, the positive electrode active material may be a sodium-containing layered oxide such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

The average particle diameter of primary particles of the positive electrode active material is greater than or equal to 50 nm and less than or equal to 100 μm.

The positive electrode active material and a negative electrode active material have a main role in battery reactions of a power storage device, and occlude and release carrier ions. To increase the lifetime of the power storage device, a material that has a small amount of capacity relating to irreversible battery reactions and has high charge and discharge efficiency is preferably used for the active materials.

The active material is in contact with an electrolytic solution. When the active material reacts with the electrolytic solution and the active material is lost and deteriorates by the reaction, the capacity of the power storage device is decreased. Thus, in order to obtain the power storage device with less deterioration, it is desirable that such a reaction not be caused in the power storage device.

Examples of the conductive additive of the electrode include acetylene black (AB), graphite (black lead) particles, carbon nanotubes, graphene, graphene oxide, and fullerene.

A network for electrical conduction can be formed in the electrode by the conductive additive. The conductive additive also allows the maintenance of a path for electric conduction between the positive electrode active material particles. The addition of the conductive additive to the positive electrode active material layer increases the electrical conductivity of the positive electrode active material layer 104.

As the binder, polyvinylidene fluoride (PVDF) as a typical example, polyimide, polytetrafluoroethylene, polyvinyl chloride, ethylene-propylene-diene polymer, fluorine rubber, polymethyl methacrylate, polyethylene, nitrocellulose, or the like can be used.

The content of the binder in the positive electrode active material layer 104 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The content of the conductive additive in the positive electrode active material layer 104 is preferably greater than or equal to 1 wt % and less than or equal to 10 wt %, more preferably greater than or equal to 1 wt % and less than or equal to 5 wt %.

In the case where the positive electrode active material layer 104 is formed by a coating method, the positive electrode active material, the binder, the conductive additive, and a dispersion medium are mixed to form an electrode slurry, and the electrode slurry is applied to the positive electrode current collector 105 and dried.

Note that the positive electrode current collector 105 can be formed using a highly conductive material which is not alloyed with a carrier ion of lithium or the like, such as a metal typified by stainless steel, gold, platinum, aluminum, or titanium or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector can have a foil-like shape, a plate-like shape (sheet-like shape), a net-like shape, a punching-metal shape, an expanded-metal shape, or the like as appropriate. The positive electrode current collector 105 preferably has a thickness greater than or equal to 5 μm and less than or equal to 30 μm. A part of the surface of the electrode current collector may be provided with an undercoat layer using graphite, graphene, graphene oxide, or the like.

Note that a structure in which the positive electrode active material layer 104 is provided on one surface of the positive electrode current collector 105 and no positive electrode active layer is provided on the other surface thereof can be employed. In the structure, the surface of the positive electrode current collector 105 on which no positive electrode active material layer is provided is flat, and has low coefficient of friction. Thus, when a surface of another positive electrode current collector on which the positive electrode active material layer is not provided is in contact with that surface, the current collectors can mutually slide in response to the stress.

In the above manner, the positive electrode of the power storage device can be manufactured.

<Structure of Negative Electrode>

Next, the negative electrode is described. The negative electrode includes the negative electrode active material layer 102 and the negative electrode current collector 101, as illustrated in FIG. 4B. Steps of forming the negative electrode are described below.

Examples of the carbon-based material as a negative electrode active material used for the negative electrode active material layer 102 include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite. In addition, examples of the shape of the graphite include a flaky shape and a spherical shape.

Other than the carbon-based material, a material that enables charge-discharge reactions by an alloying reaction and a dealloying reaction with lithium can be used for the negative electrode active material. A material containing at least one of Ga, Si, Al, Ge, Sn, Pb, Sb, Bi, Ag, Zn, Cd, In, and the like can be used, for example. Such elements have a higher capacity than carbon. In particular, silicon has a high theoretical capacity of 4200 mAh/g. Examples of the alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, for the negative electrode active material, $Li_{3-x}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide which does not cause an alloying reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 μm, for example.

Note that a plurality of materials for an active material can be combined at a given proportion both for the positive electrode active material layer 104 and the negative electrode active material layer 102. The use of a plurality of materials for the active material layer makes it possible to select the property of the active material layer in more detail.

Examples of the conductive additive of the electrode include acetylene black (AB), graphite (black lead) particles, carbon nanotubes, graphene, graphene oxide, and fullerene.

A network for electrical conduction can be formed in the electrode by the conductive additive. The conductive additive also allows maintaining of a path for electric conduction between the negative electrode active material particles. The addition of the conductive additive to the negative electrode active material layer increases the electric conductivity of the negative electrode active material layer 102.

A typical example of the binder is polyvinylidene fluoride (PVDF), and other examples of the binder include polyimide, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder in the negative electrode active material layer 102 is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The content of the conductive additive in the negative electrode active material layer 102 is preferably greater than or equal to 1 wt % and less than or equal to 10 wt % and further preferably greater than or equal to 1 wt % and less than or equal to 5 wt %.

In the case where the negative electrode active material layer 102 is formed by a coating method, the negative electrode active material, the binder, the conductive additive, and a dispersion medium are mixed to form a slurry, and the slurry is applied to the negative electrode current collector 101 and dried. If necessary, pressing may be performed after the drying.

Note that the negative electrode current collector 101 can be formed using a highly conductive material that is not alloyed with a carrier ion of, for example, lithium, such as a metal typified by stainless steel, gold, platinum, iron, copper, titanium, and tantalum or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 101 can have a foil-like shape, a plate-like shape (sheet-like shape), a net-like shape, a cylindrical shape, a coil shape, a punching-metal shape, an expanded-metal shape, or the like as appropriate. The negative electrode current collector 101 preferably has a thickness of greater than or equal to 5 μm and less than or equal to 30 μm. A part of the surface of the electrode current collector may be provided with an undercoat layer using graphite, graphene, graphene oxide, or the like.

Note that a structure in which the negative electrode active material layer 102 is provided on one surface of the negative electrode current collector 101 and no negative electrode active material layer is provided on the other surface thereof can be employed. In that case, the surface of the negative electrode current collector 101 on which no negative electrode active material layer is provided is flat, and has low coefficient of friction. Thus, when a surface of another negative electrode current collector on which no negative electrode active material layer is provided is in contact with that surface, the current collectors can mutually slide in response to the stress.

In the above manner, the negative electrode of the power storage device can be manufactured.

<Structure of Separator>

The separator 103 may be formed using a material such as paper, nonwoven fabric, fiberglass, synthetic fiber such as nylon (polyamide), vinylon (polyvinyl alcohol based fiber), polyester, acrylic, polyolefin, or polyurethane. However, a material that does not dissolve in an electrolytic solution described later needs to be selected.

More specifically, as a material for the separator 103, any of polymer compounds based on a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

The separator 103 needs to have an insulating property of inhibiting the contact between the positive electrode and the negative electrode, a property of holding the electrolytic solution, and ionic conductivity. As a method for forming a film having a function of a separator, a method for forming a film by stretching is given. Examples of the method include a stretching aperture method in which a melted polymer material is spread, heat is released from the material, and pores are formed by stretching the resulting film in the directions of two axes parallel to the film.

Through the above steps, the separator can be incorporated in the power storage device.

<Components of Electrolytic Solution>

The electrolytic solution 107 that can be used in the power storage device of one embodiment of the present invention is preferably a nonaqueous solution (solvent) containing an electrolyte (solute).

For a solvent of the electrolytic solution 107, a material in which carrier ions can transfer is used. For example, an aprotic organic solvent is preferable. One of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination at an appropriate ratio.

When a gelled high-molecular material is used as the solvent for the electrolytic solution 107, safety against liquid leakage and the like is improved. Furthermore, a power storage device can be thinner and more lightweight. Typical examples of the gelled high-molecular material include a silicone gel, an acrylic gel, an acrylonitrile gel, a poly (ethylene oxide)-based gel, a poly(propylene oxide)-based gel, a gel of a fluorine-based polymer, and the like.

Alternatively, the use of one or more ionic liquids (room temperature molten salts) that have non-flammability and non-volatility as the solvent for the electrolytic solution can prevent a power storage device from exploding or catching fire even when the power storage device internally shorts out or the internal temperature increases due to overcharging or the like. Thus, the power storage device has improved safety.

The electrolytic solution used for the power storage device preferably contains a small amount of dust particles and elements other than the constituent elements of the electrolytic solution (hereinafter also simply referred to as impurities) so as to be highly purified. Specifically, the mass ratio of impurities to the electrolytic solution is less than or equal to 1%, preferably less than or equal to 0.1%, and more preferably less than or equal to 0.01%. An additive agent such as vinylene carbonate may be added to the electrolytic solution.

In the case of using lithium ions as carrier ions, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination at an appropriate ratio.

Although the case where carrier ions are lithium ions in the above electrolyte is described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

Note that the electrolytic solution reacts with and corrodes the positive electrode current collector in some cases. In order to inhibit such corrosion, several weight percent of $LiPF_6$ is preferably added to the electrolytic solution, in which case a passivating film is formed on a surface of the positive electrode current collector and inhibits a reaction between the electrolytic solution and the positive electrode current collector. Note that the concentration of $LiPF_6$ is less than or equal to 10 wt %, preferably less than or equal to 5 wt %, and more preferably less than or equal to 3 wt % in order that the positive electrode active material layer is not dissolved.

<Structure of Exterior Body>

Next, the exterior body 116 is described. As the exterior body 116, for example, a film having a three-layer structure is preferably employed in which the film 111 containing titanium and one or more elements selected from niobium, tantalum, vanadium, zirconium, and hafnium is provided over the film 112 containing an organic material such as polyethylene, polypropylene, polycarbonate, ionomer, or polyamide, and the film 113 containing an organic material such as an insulating synthetic resin, e.g., a silicone resin, a polyamide-based resin, or a polyester-based resin, is provided as an outer surface of the exterior body over the film 111. With such a three-layer structure, entry of an electrolytic solution and permeation of a gas can be blocked and an insulating property and resistance to the electrolytic solution can be obtained. The resistance to the electrolytic solution refers to a property of not easily reacting and forming a reactant even when in contact with the electrolytic solution. The exterior body is folded inwardly with one portion overlapping with another portion thereof, or two exterior bodies are stacked with the inner surfaces facing each other, in which case application of heat melts the materials on the overlapping inner surfaces to cause fusion bonding between the inner surfaces of the two exterior bodies. In this manner, a sealing structure can be formed.

The film 111 preferably includes a region with a thickness of more than or equal to 10 μm and less than or equal to 150 μm. This enables the exterior body 116 to have flexibility.

The film 111 preferably includes a region with a density of more than or equal to 5 g/cm$^3$ and less than or equal to 6 g/cm$^3$. Thus, the film can have a low Young's modulus and a high strength. This can reduce a fracture of the exterior body 116 due to a change in shape by repeated bending.

The film 111 can be formed using an alloy of titanium and one or more elements selected from niobium, tantalum, vanadium, zirconium, and hafnium. For example, Ti—Nb—Ta—Zr—O, Ti—Ta—Nb—V—Zr—O, or the like may be used. In that case, the film 111 can have a 0.2% proof stress. For example, the film 111 has a 0.2% proof stress of more than or equal to 900 MPa and less than or equal to 1700 MPa.

The film 111 has ductility or malleability, which prevents the film 111 from being easily fractured and thus enables the film 111 to maintain a gas barrier property even when the film 111 is changed in shape by bending or the like.

The exterior body preferably has a sealing structure by fusion bonding or the like. In the case where two exterior bodies are stacked, the sealing portion is formed along the entire circumference by heat fusion bonding or the like.

Although, in the above description, the film having a three-layer structure is used as the exterior body, one embodiment of the present invention is not limited thereto. For example, a two-layer structure including the film containing an organic material and the film containing titanium and one or more elements selected from niobium, tantalum, vanadium, zirconium, and hafnium may be employed, or a structure including four or more layers may be employed.

<Flexible Power Storage Device>

When a flexible material is selected from materials of the members described in this embodiment and used, a flexible power storage device can be manufactured. Deformable devices are currently under active research and development. For such devices, flexible power storage devices are demanded.

Figure 8A:
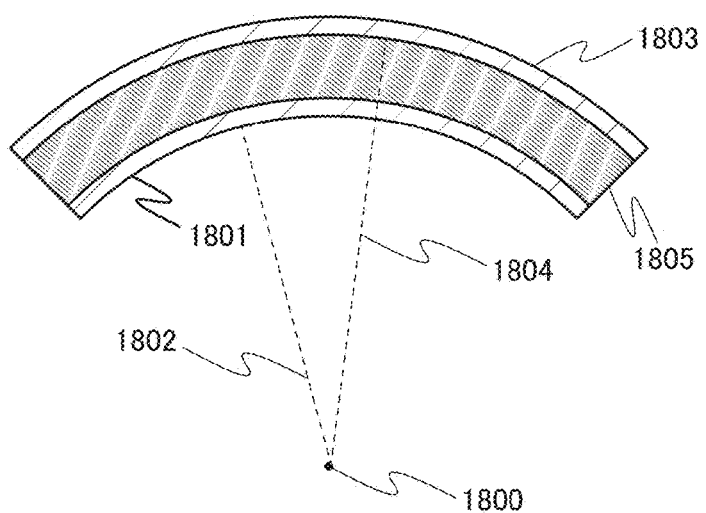
FIGS. 8A to 8D illustrate the radius of curvature.
Figure 8B:
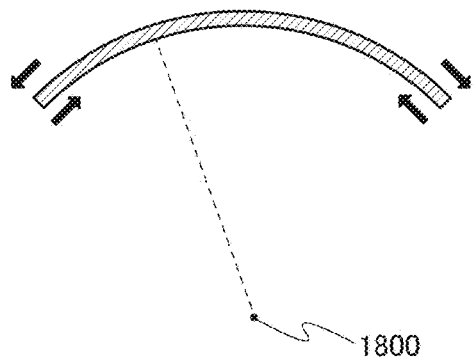

In the case of bending a power storage device in which a component 1805 including electrodes and an electrolytic solution is sandwiched between two films as an exterior body, a radius 1802 of curvature of a film 1801 on the side closer to a center 1800 of curvature of the power storage device is smaller than a radius 1804 of curvature of a film 1803 on the side farther from the center 1800 of curvature (see FIG. 8A). When the power storage device is curved and has an arc-shaped cross section, compressive stress is applied to a surface of the film on the side closer to the center 1800 of curvature and tensile stress is applied to a surface of the film on the side farther from the center 1800 of curvature (see FIG. 8B).

When a flexible power storage device is changed in shape, strong stress is applied to the exterior body. However, by forming a pattern including projections or depressions on surfaces of the exterior body, the influence of a strain can be reduced even when compressive stress and tensile stress are applied by the change in shape of the power storage device. For this reason, the power storage device can change its shape such that the exterior body has a curvature radius of 50 mm, preferably 20 mm, on the side closer to the center of curvature.

Figure 9A:
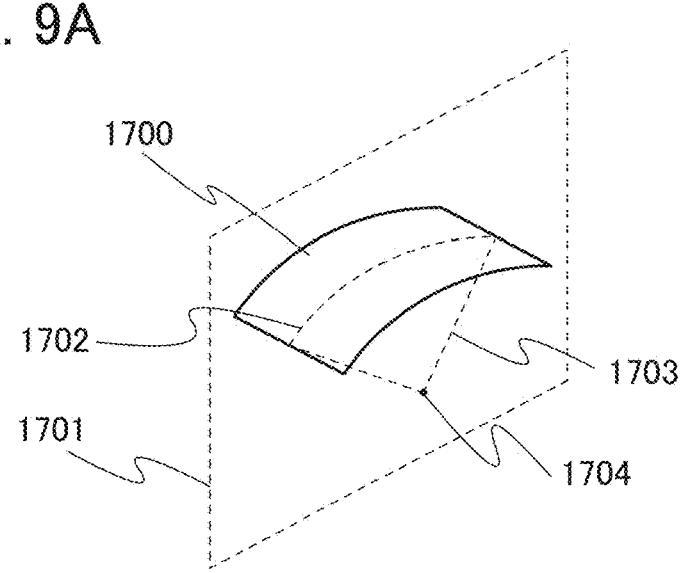
FIGS. 9A to 9C illustrate the radius of curvature.
Figure 9B:
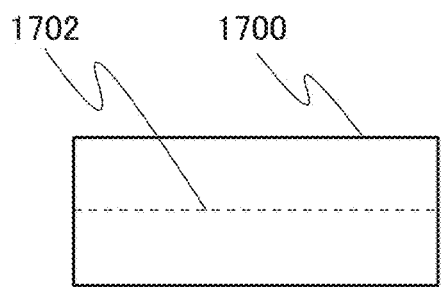
Figure 9C:
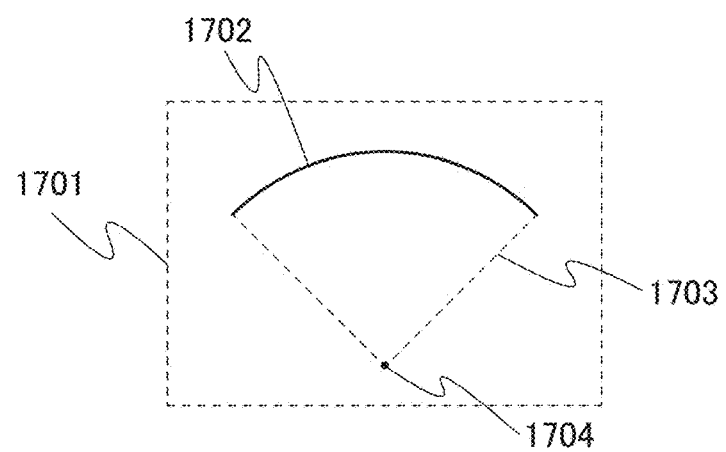

Description is given of the radius of curvature of a surface with reference to FIGS. 9A to 9C. In FIG. 9A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 9B is a top view of the curved surface 1700. FIG. 9C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 8C:
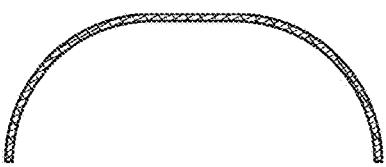
Figure 8D:

Note that the cross-sectional shape of the power storage device is not limited to a simple arc shape, and the cross section can be partly arc-shaped; for example, a shape illustrated in FIG. 8C, a wavy shape (see FIG. 8D), or an S shape can be used. When the curved surface of the power storage device has a shape with a plurality of centers of curvature, the power storage device can change its shape such that a curved surface with the smallest radius of curvature among radii of curvature with respect to the plurality of centers of curvature, which is a surface of the exterior body on the side closer to the center of curvature, has a curvature radius of 50 mm, preferably 20 mm.

<Assembly of Power Storage Device and Aging>

Next, the above components are combined and enclosed in the exterior body 116, so that the inner structure including a plurality of stacks each including the positive electrode current collector 105, the positive electrode active material layer 104, the separator 103, the negative electrode active material layer 102, and the negative electrode current collector 101 is enclosed in the exterior body 116 together with the electrolytic solution 107 as illustrated in FIGS. 1A to 1C and FIGS. 4A and 4B.

Then, an aging step is performed. First, the ambient temperature is kept at about room temperature, for example, and constant current charging is performed to a predetermined voltage at a low rate. Next, a gas generated by the charging in a region surrounded by the exterior body is released to the outside of the exterior body, and then charging is performed at a rate higher than that of the initial charging.

After that, the power storage device is kept at a somewhat high temperature for a long time. For example, the power storage device is kept at higher than or equal to 40° C. for longer than or equal to 24 hours.

After the power storage device is kept at a somewhat high temperature for a long time, a gas generated again in the region surrounded by the exterior body is released. Furthermore, the power storage device is discharged at a rate of 0.2 C at room temperature, charged at the same rate, discharged at the same rate again, and further charged at the same rate. Then, discharging is performed at the same rate, which is the end of the aging step.

In the aforementioned manner, the power storage device of one embodiment of the present invention can be manufactured.

This embodiment can be implemented in appropriate combinations with any of the other embodiments.

Note that in the case where at least one specific example is described in a diagram or text in one embodiment in this specification and the like, it will be readily appreciated by those skilled in the art that a generic concept of the specific example can be derived. Therefore, in the diagram or the text in one embodiment, in the case where at least one specific example is described, a generic concept of the specific example is disclosed as one embodiment of the invention, and one embodiment of the invention can be constituted. The embodiment of the invention is clear.

Note that in this specification and the like, what is illustrated at least in a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the invention is clear.

In this embodiment, one embodiment of the present invention has been described. Other embodiments of the present invention are described in the other embodiments. Note that one embodiment of the present invention is not limited thereto. In other words, since various embodiments of the invention are described in this embodiment and the other embodiments, one embodiment of the present invention is not limited to a particular embodiment. For example, although an example of use in a flexible lithium-ion power storage device is described in this embodiment, one embodiment of the present invention is not limited thereto. Depending on circumstances or conditions, one embodiment of the present invention can be applied to a variety of power storage devices such as a lead storage battery, a lithium-ion polymer power storage device, a nickel-hydrogen storage battery, a nickel-cadmium storage battery, a nickel-iron storage battery, a nickel-zinc storage battery, a silver oxidezinc storage battery, a solid-state battery, and an air battery; a primary battery; a capacitor such as an electric double layer capacitor, an ultracapacitor, a supercapacitor, and a lithium-ion capacitor; and the like. Furthermore, depending on circumstances or conditions, for example, one embodiment of the present invention is not necessarily applied to a lithium-ion power storage device. Although an example in which one embodiment of the present invention is applied to a curved power storage device, a flexible power storage device, or a power storage device that can change in shape is described, one embodiment of the present invention is not limited thereto. Depending on circumstances or conditions, one embodiment of the present invention may be applied to a power storage device that can have any of a variety of shapes or a power storage device that can have any level of hardness. Depending on circumstances or conditions, one embodiment of the present invention may be applied to a power storage device that is not curved and has a flat plate shape or a power storage device that has a cylindrical shape. Depending on circumstances or conditions, one embodiment of the present invention may be applied to a power storage device that does not have flexibility and cannot be changed in shape.

Embodiment 2

In this embodiment, structures of a storage battery of one embodiment of the present invention are described with reference to FIGS. 10A and 10B, FIG. 11, FIG. 12, FIGS. 13A to 13C, and FIGS. 14A to 14E.

<Laminated Storage Battery>

An example of a laminated storage battery will be described with reference to FIG. 10A. When a flexible laminated storage battery is used in an electronic device at least part of which is flexible, the storage battery can be bent as the electronic device is bent.

Figure 10A:
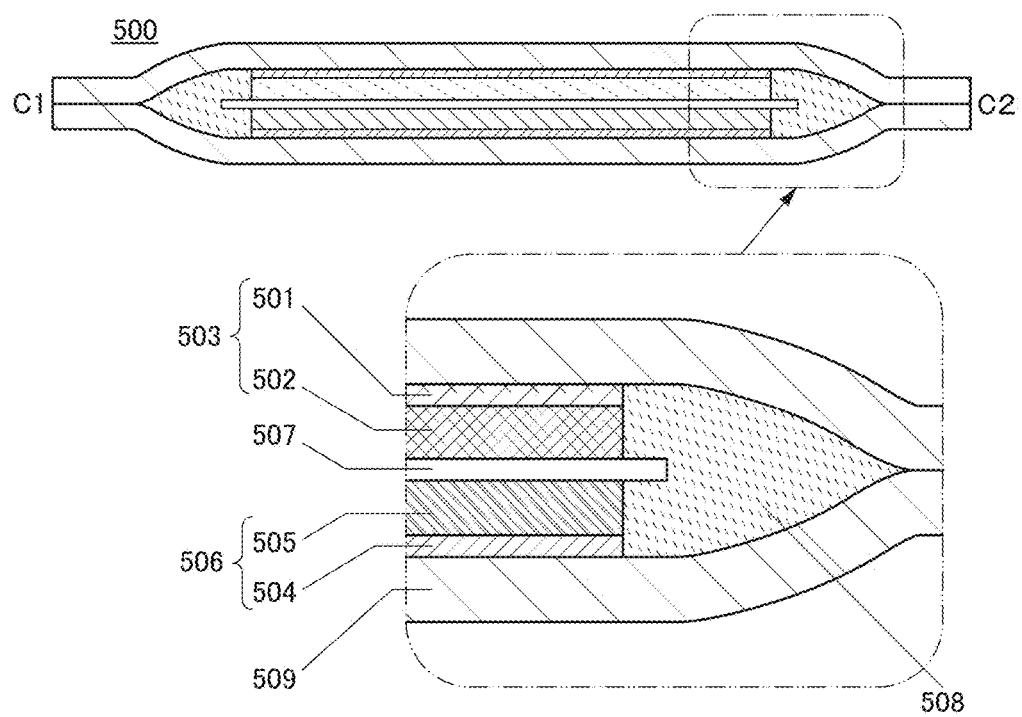
FIGS. 10A and 10B each illustrate a laminated storage battery.

A laminated storage battery 500 illustrated in FIG. 10A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. A region surrounded by the exterior body 509 is filled with the electrolytic solution 508. The exterior body described in Embodiment 1 can be used as the exterior body 509. Accordingly, sufficient barrier properties can be kept even when the exterior body 509 is changed in shape.

In the laminated storage battery 500 illustrated in FIG. 10A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a tab electrode and the positive electrode current collector 501 or the negative electrode current collector 504 may be bonded to each other by ultrasonic welding, and instead of the positive electrode current collector 501 and the negative electrode current collector 504, the tab electrode may be exposed to the outside of the exterior body 509.

As the exterior body 509, for example, a film having a three-layer structure is preferably employed in which a film containing titanium and one or more elements selected from niobium, tantalum, vanadium, zirconium, and hafnium is provided over a film containing an organic material such as polyethylene, polypropylene, polycarbonate, ionomer, or polyamide, and a film containing an organic material such as an insulating synthetic resin, e.g., a silicone resin, a polyamide-based resin, or a polyester-based resin, is provided as an outer surface of the exterior body thereover. With such a three-layer structure, permeation of an electrolytic solution and a gas can be blocked and an insulating property and resistance to the electrolytic solution can be obtained. The exterior body is folded inwardly with one portion overlapping with another portion thereof, or two exterior bodies are stacked with the inner surfaces facing each other, in which case application of heat melts the materials on the overlapping inner surfaces to cause fusion bonding between the two exterior bodies. In this manner, a sealing structure can be formed.

Figure 10B:
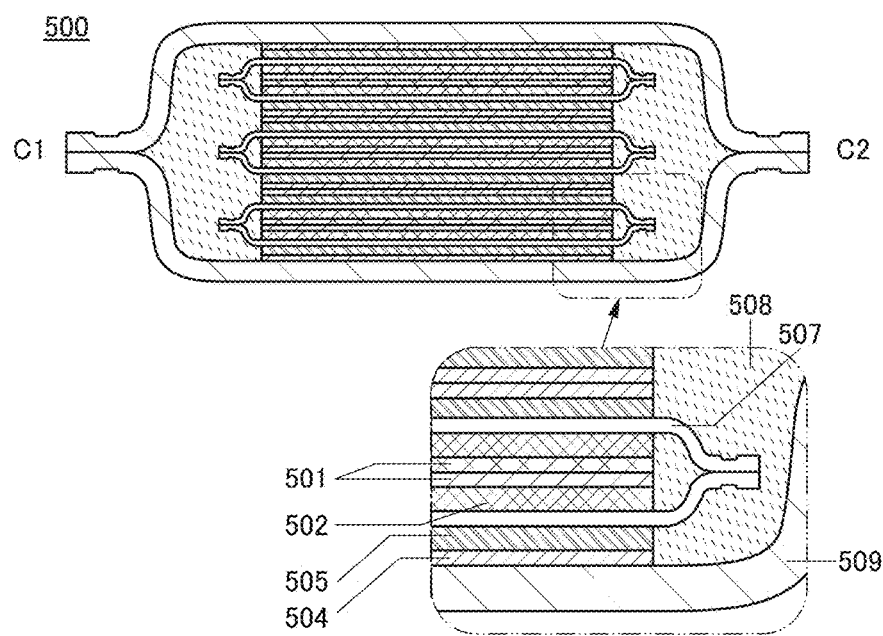

FIG. 10B illustrates an example of a cross-sectional structure of the laminated storage battery 500. Although FIG. 10A illustrates an example of a single-layer type including only two current collectors for simplicity, an actual battery is a laminated type including a plurality of electrode layers.

The example in FIG. 10B includes 12 electrode layers. The laminated storage battery 500 has flexibility even though including 12 electrode layers. FIG. 10B illustrates a structure including six layers of negative electrode current collectors 504 and six layers of positive electrode current collectors 501, i.e., 12 layers in total. It is needless to say that the number of electrode layers is not limited to 12, and may be more than 12 or less than 12. In the case of a large number of electrode layers, the storage battery can have high capacity. In contrast, in the case of a small number of electrode layers, the storage battery can have small thickness and high flexibility.

Figure 11:
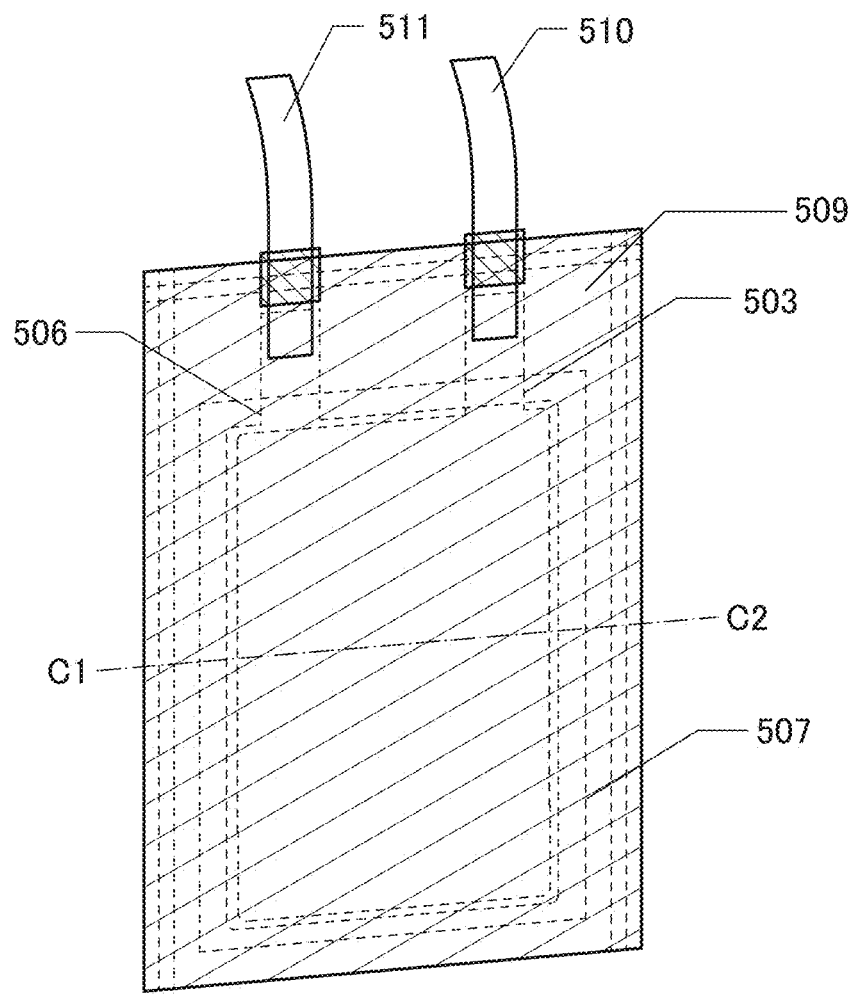
FIG. 11 illustrates an external view of a storage battery.
Figure 12:
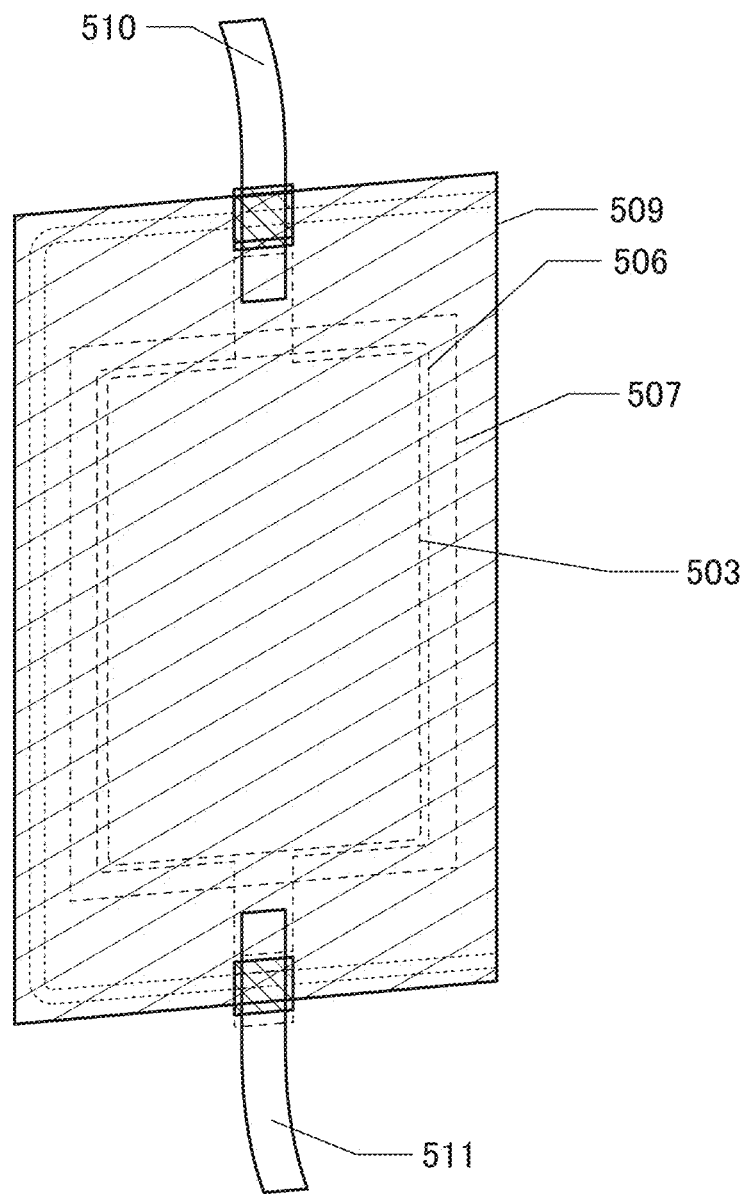
FIG. 12 illustrates an external view of a storage battery.

FIGS. 11 and 12 each illustrate an example of the external view of the laminated storage battery 500. Note that FIGS. 10A and 10B each illustrate a cross-sectional view taken along dashed-dotted line C1-C2 of the laminated storage battery 500 in FIG. 11. In FIGS. 11 and 12, the positive electrode 503, the negative electrode 506, the separator 507, the exterior body 509, a positive electrode tab electrode 510, and a negative electrode tab electrode 511 are included.

Figure 13A:
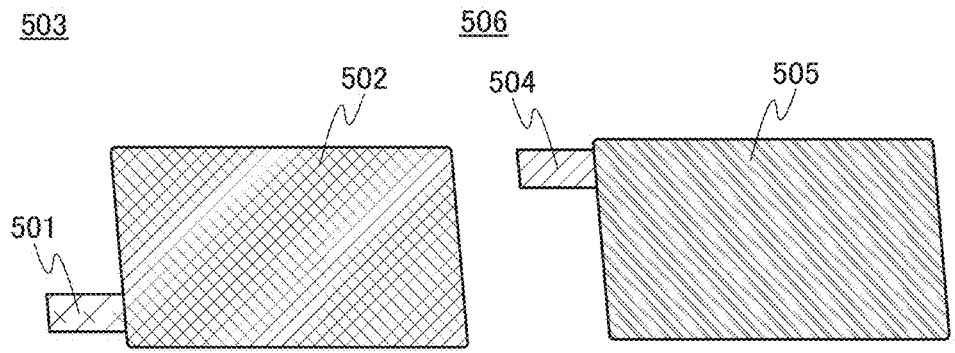
FIGS. 13A to 13C illustrate a flexible laminated storage battery.

FIG. 13A illustrates the external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 13A.

<Method for Manufacturing Laminated Storage Battery>

Figure 13B:
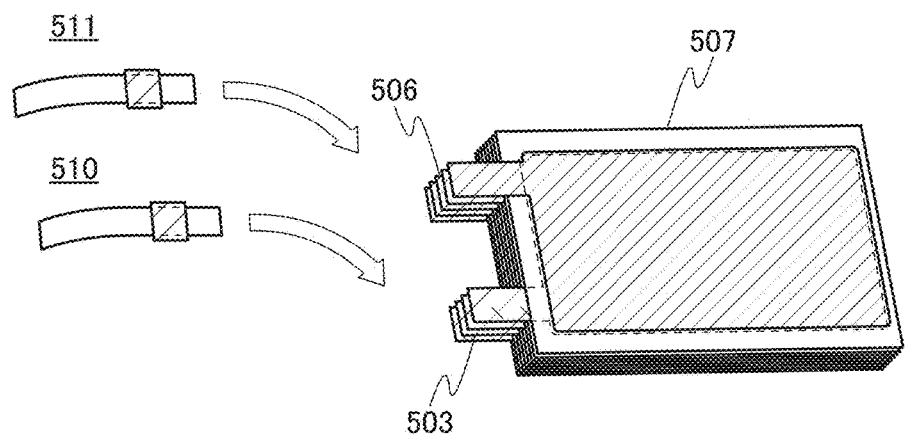

Here, an example of a method for manufacturing the laminated storage battery whose external view is illustrated in FIG. 11 will be described with reference to FIGS. 13B and 13C.

First, the negative electrode 506, the separator 507, and the positive electrode 503 are stacked. FIG. 13B illustrates a stack including the negative electrode 506, the separator 507, and the positive electrode 503. The storage battery described here as an example includes 5 negative electrodes and 4 positive electrodes. Next, the tab regions of the positive electrodes 503 are bonded to each other, and the positive electrode tab electrode 510 is bonded to the tab region of the positive electrode on the outermost surface. The bonding can be performed by ultrasonic welding, for example. In a similar manner, the tab regions of the negative electrodes 506 are bonded to each other, and the negative electrode tab electrode 511 is bonded to the tab region of the negative electrode on the outermost surface.

After that, the negative electrode 506, the separator 507, and the positive electrode 503 are placed over the exterior body 509.

Figure 13C:
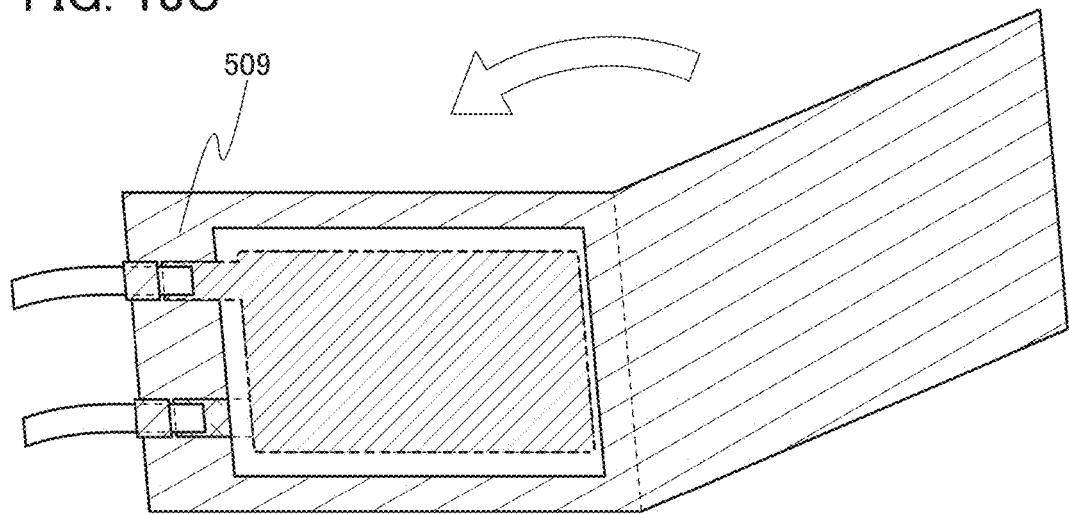

Subsequently, the exterior body 509 is folded along a dashed line as illustrated in FIG. 13C. Then, the outer edge of the exterior body 509 is bonded. The bonding can be performed by thermocompression bonding, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be manufactured.

Note that in this embodiment, the laminated storage battery is given as an example of the storage battery; however, any of storage batteries with a variety of shapes, such as a coin-type storage battery, a cylindrical storage battery, a sealed storage battery, and a square-type storage battery, can be used. Furthermore, a structure in which a plurality of positive electrodes, a plurality of negative electrodes, and a plurality of separators are stacked, or a structure in which a positive electrode, a negative electrode, and a separator are wound may be employed.

FIGS. 14A to 14E illustrate examples of electronic devices including flexible laminated storage batteries. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of a car.

FIG. 14A illustrates an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a storage battery 7407.

FIG. 14B illustrates the mobile phone 7400 that is bent. When the whole mobile phone 7400 is bent by external force, the storage battery 7407 included in the mobile phone 7400 is also bent. FIG. 14C illustrates the bent storage battery 7407. The storage battery 7407 is a laminated storage battery. As the storage battery 7407, for example, the power storage device including the exterior body described in Embodiment 1 is used.

FIG. 14D illustrates an example of a bangle display device. A portable display device 7100 includes a housing 7101, a display portion 7102, an operation button 7103, and a storage battery 7104. FIG. 14E illustrates the bent storage battery 7104.

Next, other examples of methods for forming stacks included in the storage battery are described with reference to FIGS. 15A to 15C, FIGS. 16A to 16D, FIGS. 17A, 17B, 17C1, 17C2, and 17D, and FIGS. 18A to 18D.

Figure 15A:
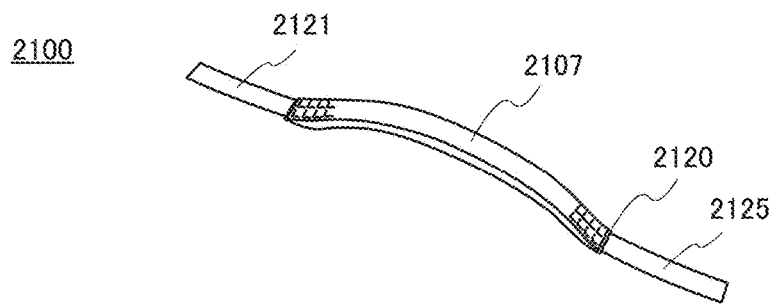
FIGS. 15A to 15C are a perspective view, a top view, and a cross-sectional view illustrating a structural example of a storage battery.
Figure 15B:
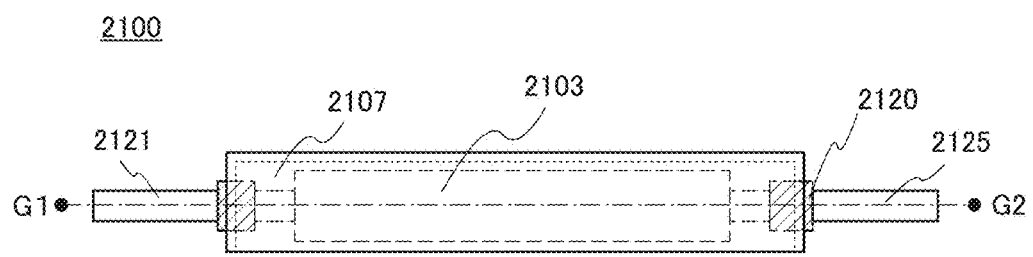
Figure 15C:
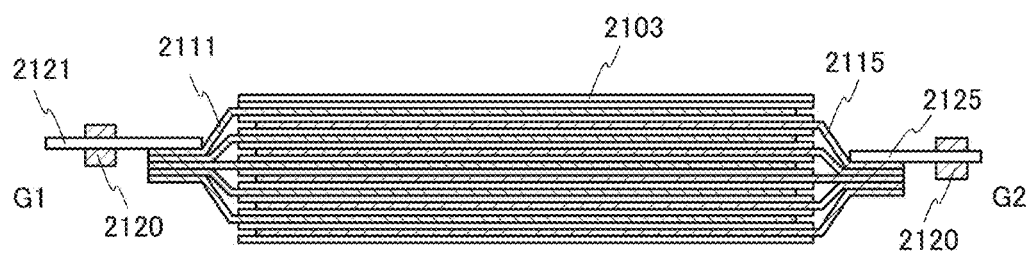

FIGS. 15A to 15C illustrate a storage battery 2100 of one embodiment of the present invention. FIG. 15A is a perspective view of the storage battery 2100, and FIG. 15B is a top view thereof. FIG. 15C is a cross-sectional view taken along dashed-dotted line G1-G2 in FIG. 15B. The storage battery 2100 includes a positive electrode lead 2121, a negative electrode lead 2125, a positive electrode 2111, a negative electrode 2115, a sealing layer 2120, and a separator 2103. Three sides of an exterior body 2107 in the storage battery 2100 are sealed, as illustrated in FIG. 15B. The exterior body 2107 is not illustrated in FIG. 15C.

Here, some steps in a method for manufacturing the storage battery 2100 illustrated in FIGS. 15A to 15C will be described with reference to FIGS. 16A to 16D.

First, the negative electrode 2115 is positioned over the separator 2103 (FIG. 16A) such that a negative electrode active material layer in the negative electrode 2115 overlaps with the separator 2103.

Then, the separator 2103 is folded such that part of the separator 2103 is positioned over the negative electrode 2115. Next, the positive electrode 2111 is positioned over the separator 2103 (FIG. 16B) such that a positive electrode active material layer included in the positive electrode 2111 overlaps with the separator 2103 and the negative electrode active material layer. In the case where an electrode in which an active material layer is formed on one surface of a current collector is used, the positive electrode active material layer of the positive electrode 2111 and the negative electrode active material layer of the negative electrode 2115 are positioned so as to face each other with the separator 2103 therebetween.

Figure 16A:
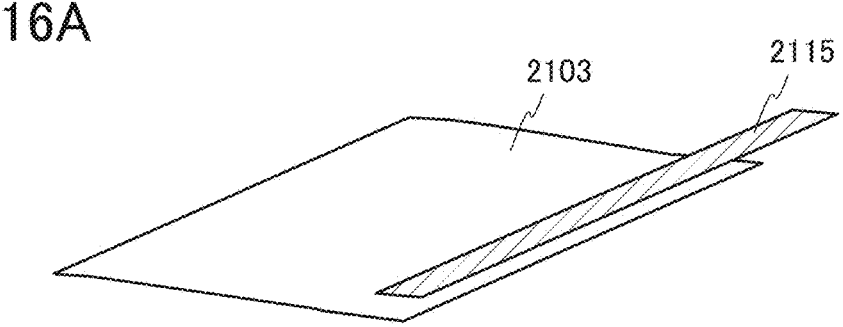
FIGS. 16A to 16D illustrate an example of a method for manufacturing a storage battery.
Figure 16B:
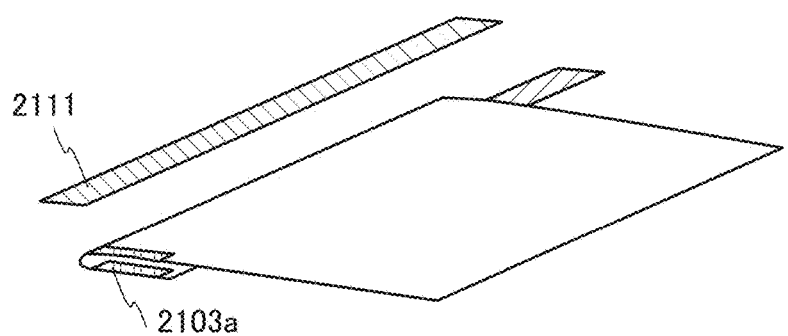

In the case where the separator 2103 is formed using a material that can be thermally welded, such as polypropylene, a region where the separator 2103 overlap with itself is thermally welded and then another electrode is positioned so as to overlap with the separator 2103, whereby the slippage of the electrode in the manufacturing process can be minimized. Specifically, a region which does not overlap with the negative electrode 2115 and the positive electrode 2111 and in which the separator 2103 overlaps with itself, e.g., a region 2103a in FIG. 16B, is preferably thermally welded.

Figure 16C:
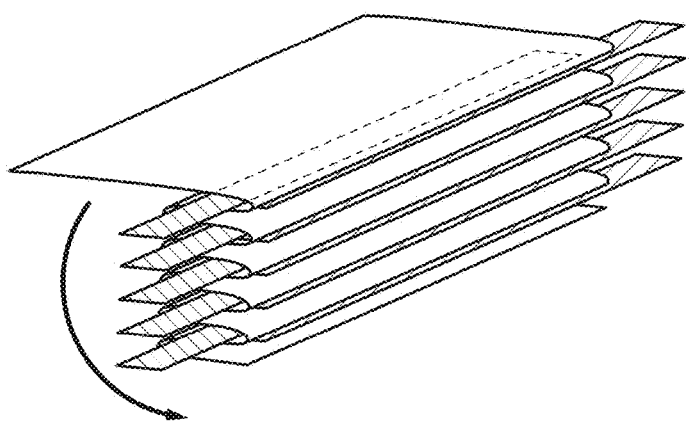

By repeating the above steps, the positive electrode 2111 and the negative electrode 2115 can overlap with each other with the separator 2103 therebetween as illustrated in FIG. 16C.

Note that a plurality of positive electrodes 2111 and a plurality of negative electrodes 2115 may be alternately placed to be sandwiched between portions of the separator 2103 that is repeatedly folded in advance.

Next, as illustrated in FIG. 16C, the plurality of positive electrodes 2111 and the plurality of negative electrodes 2115 are covered with the separator 2103.

Figure 16D:
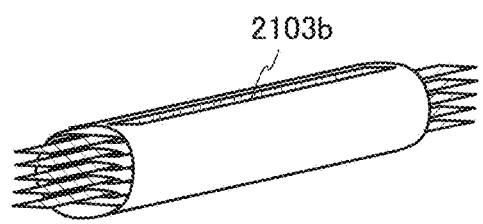

Then, as illustrated in FIG. 16D, a region where the separator 2103 overlaps with itself, e.g., a region 2103b in FIG. 16D, is thermally welded, whereby the plurality of positive electrodes 2111 and the plurality of negative electrodes 2115 are covered with and bundled in the separator 2103.

Note that the plurality of positive electrodes 2111, the plurality of negative electrodes 2115, and the separator 2103 may be bundled using a binding material.

Since the positive electrodes 2111 and the negative electrodes 2115 are stacked through the above steps, one separator 2103 has a region sandwiched between the plurality of positive electrodes 2111 and the plurality of negative electrodes 2115 and a region positioned so as to cover the plurality of positive electrodes 2111 and the plurality of negative electrodes 2115.

In other words, the separator 2103 included in the storage battery 2100 in FIGS. 15A to 15C is a single separator which is partly folded. Between the folded parts of the separator 2103, the positive electrodes 2111 and the negative electrodes 2115 are sandwiched.

The description in Embodiment 1 can be referred to for structures of the storage battery 2100 other than bonding regions of the exterior body 2107, the shapes of the positive electrodes 2111, the negative electrodes 2115, the separator 2103, and the exterior body 2107, and the positions and shapes of the positive electrode lead 2121 and the negative electrode lead 2125. The manufacturing method described in Embodiment 1 can be referred to for the steps other than the steps of stacking the positive electrodes 2111 and the negative electrodes 2115 in the manufacturing method of the storage battery 2100.

Figure 17A:
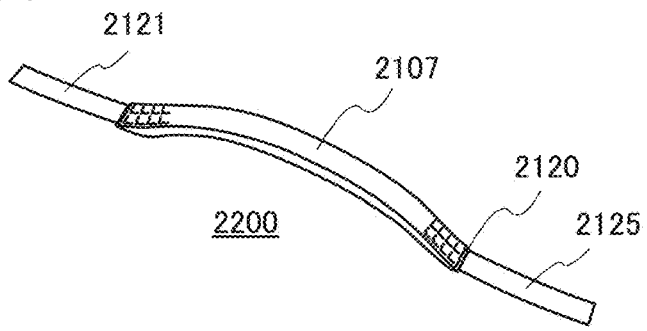
Figure 17B:
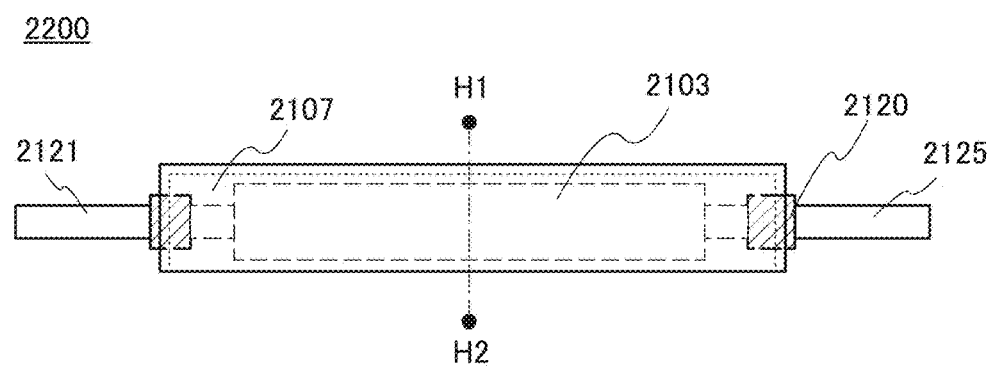
Figure 17B:
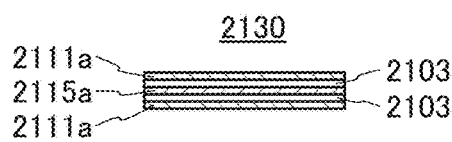
Figure 17B:
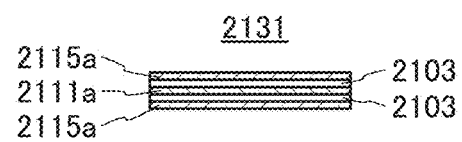
Figure 17D:
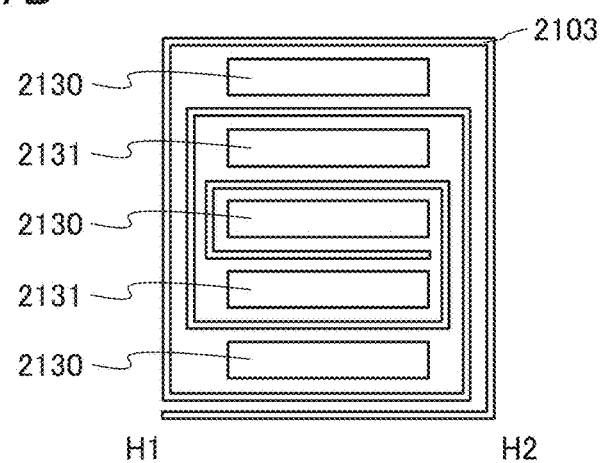

FIGS. 17A, 17B, 17C1, 17C2, and 17D illustrate a storage battery 2200, which is different from the storage battery illustrated in FIGS. 15A to 15C. FIG. 17A is a perspective view of the storage battery 2200, and FIG. 17B is a top view thereof. FIG. 17C1 is a cross-sectional view of a first electrode assembly 2130, and FIG. 17C2 is a cross-sectional view of a second electrode assembly 2131. FIG. 17D is a cross-sectional view taken along the dashed-dotted line H1-H2 in FIG. 17B. In FIG. 17D, the first electrode assembly 2130, the second electrode assembly 2131, and the separator 2103 are selectively illustrated for the sake of clarity.

The storage battery 2200 illustrated in FIGS. 17A, 17B, 17C1, 17C2, and 17D is different from the storage battery 2100 illustrated in FIGS. 15A to 15C in the positions of the positive electrodes 2111, the negative electrodes 2115, and the separator 2103.

As illustrated in FIG. 17D, the storage battery 2200 includes a plurality of first electrode assemblies 2130 and a plurality of second electrode assemblies 2131.

As illustrated in FIG. 17C1, in each of the first electrode assemblies 2130, a positive electrode 2111a including positive electrode active material layers on both surfaces of a positive electrode current collector, the separator 2103, a negative electrode 2115a including negative electrode active material layers on both surfaces of a negative electrode current collector, the separator 2103, and the positive electrode 2111a including the positive electrode active material layers on both surfaces of the positive electrode current collector are stacked in this order. As illustrated in FIG. 17C2, in each of the second electrode assemblies 2131, the negative electrode 2115a including the negative electrode active material layers on both surfaces of the negative electrode current collector, the separator 2103, the positive electrode 2111a including the positive electrode active material layers on both surfaces of the positive electrode current collector, the separator 2103, and the negative electrode 2115a including the negative electrode active material layers on both surfaces of the negative electrode current collector are stacked in this order.

As illustrated in FIG. 17D, the plurality of first electrode assemblies 2130 and the plurality of second electrode assemblies 2131 are covered with the wound separator 2103.

Here, some steps in a method for manufacturing the storage battery 2200 illustrated in 17A, 17B, 17C1, 17C2, and 17D will be described with reference to FIGS. 18A to 18D.

Figure 18A:
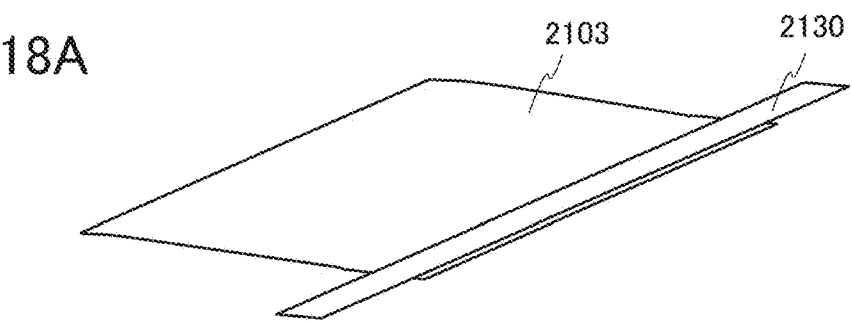
FIGS. 18A to 18D illustrate an example of a method for manufacturing a storage battery.

First, the first electrode assembly 2130 is positioned over the separator 2103 (FIG. 18A).

Figure 18B:
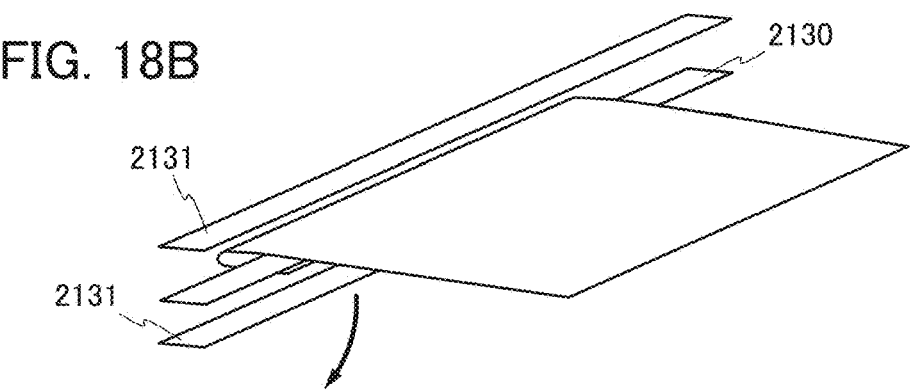

Then, the separator 2103 is folded such that part of the separator 2103 is positioned over the first electrode assembly 2130. Next, two second electrode assemblies 2131 are positioned over and under the first electrode assembly 2130 with the separator 2103 therebetween (FIG. 18B).

Figure 18C:
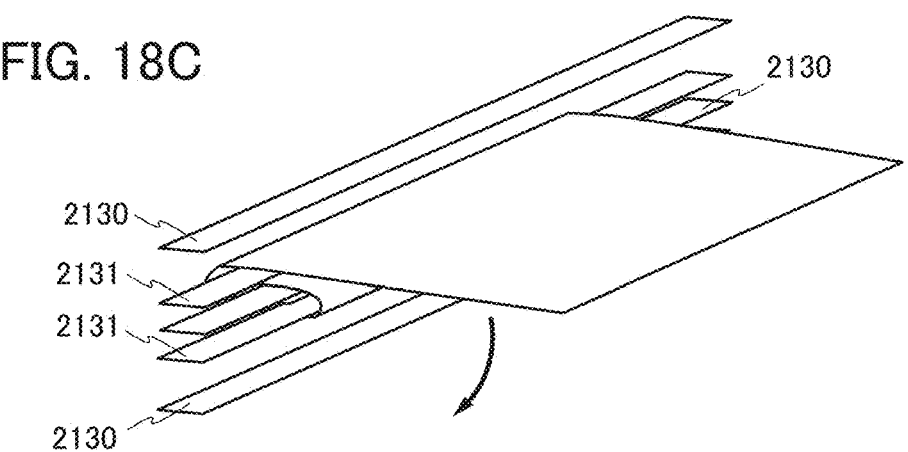

Then, the separator 2103 is wound so as to cover the two second electrode assemblies 2131. Next, two first electrode assemblies 2130 are positioned over and under the two second electrode assemblies 2131 with the separator 2103 therebetween (FIG. 18C).

Figure 18D:
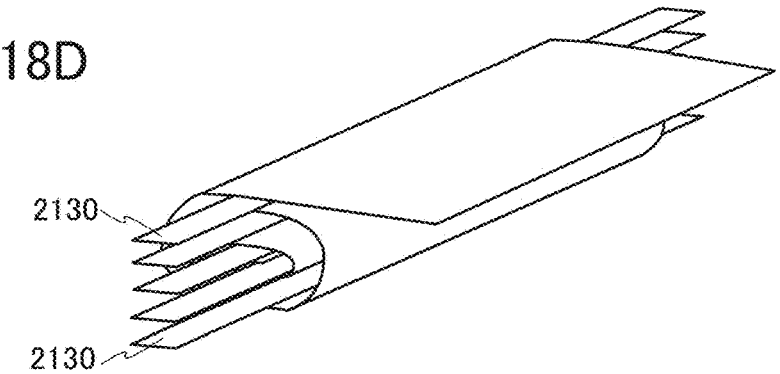

Then, the separator 2103 is wound so as to cover the two first electrode assemblies 2130 (FIG. 18D).

Since the plurality of first electrode assemblies 2130 and the plurality of second electrode assemblies 2131 are stacked through the above steps, the electrode assemblies are positioned between portions of the separator 2103 that is spirally wound.

It is preferable that the positive electrode 2111a of the first electrode assembly 2130 that is positioned on the outermost side include no positive electrode active material layer on the outer side.

In the example illustrated in FIGS. 17C1 and 17C2, the electrode assembly includes three electrodes and two separators; however, one embodiment of the present invention is not limited to this example. The electrode assembly may include four or more electrodes and three or more separators. As the number of electrodes is increased, the capacity of the storage battery 2200 can be further improved. Note that the electrode assembly may include two electrodes and one separator. In the case where the number of electrodes is small, the storage battery 2200 can have higher resistance to bending. In the example illustrated in FIG. 17D, the storage battery 2200 includes three first electrode assemblies 2130 and two second electrode assemblies 2131; however, one embodiment of the present invention is not limited to this example. The storage battery 2200 may include more electrode assemblies. As the number of electrode assemblies is increased, the capacity of the storage battery 2200 can be further improved. The storage battery 2200 may include a smaller number of electrode assemblies. In the case where the number of electrode assemblies is small, the storage battery 2200 can have higher resistance to bending.

The description of FIGS. 15A to 15C can be referred to for structures other than the positions of the positive electrodes 2111, the negative electrodes 2115, and the separator 2103 of the storage battery 2200.

This embodiment can be implemented in appropriate combinations with any of the other embodiments.

Embodiment 3

In this embodiment, an example of an electronic device including the power storage device described in Embodiment 1 or the like will be described.

Figure 19:
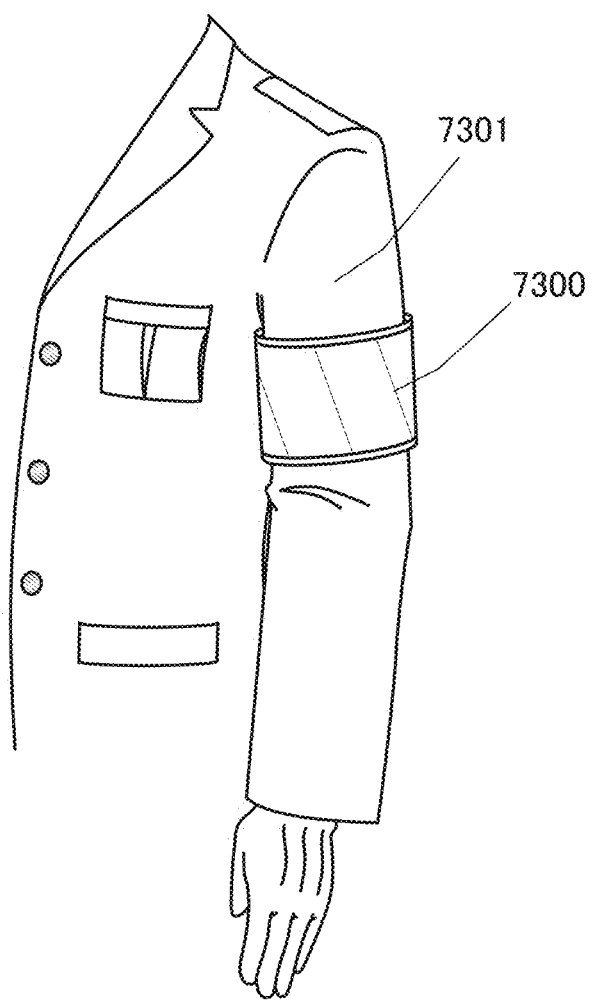
FIG. 19 illustrates an example of an electronic device.

FIG. 19 illustrates an example of an armband electronic device including a flexible power storage device. An armband device 7300 illustrated in FIG. 19 can be worn on an arm 7301 and includes a display portion having a curved surface and a bendable power storage device.

Note that in the display portion, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), an interferometric modulator display (IMOD) element, a MEMS shutter display element, an optical-interference-type MEMS display element, an electrowetting element, a piezoelectric ceramic display, a display element including a carbon nanotube, and the like. In addition to that, the display element, the display device, the light-emitting element, or the light-emitting device may include a display medium whose contrast, luminance, reflectivity, transmittance, or the like is changed by an electrical or magnetic effect. Examples of display devices including EL elements include an EL display. Display devices including electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink or an electrophoretic element include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite.

The armband device 7301 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, or a speaker.

For example, when a user wears the armband device 7300 on his or her arm and makes its display portion emit light at nighttime, traffic safety can be ensured. As another example, when a soldier, a security guard, or the like wears the armband device 7300 on his or her upper arm, he or she can check a superior's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful for a soldier or a security guard to be able to wear it on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging his or her arms. Stopping swinging his or her arms might disturb his or her rhythm, obstructing his or her run. However, wearing the armband device 7300 on his or her upper arm enables him or her to check the time without stopping swinging of his or her arm. Furthermore, it can display other information (e.g., his or her position in a course or his or her health condition) on its display screen. It is more useful when it further has a function that allows an athlete to operate it by voice input or the like without using his or her hands, seek instructions from his or her coach by a communication function, and check the instructions which are output by voice output from an audio output portion such as a speaker or which are displayed on its display screen.

As another example, when a construction worker or the like who wears a helmet wears the armband device 7300 on his or her arm and operates it, he or she can exchange information by communication to easily obtain the positional information of other workers so that he or she can work safely.

This embodiment can be implemented in appropriate combinations with any of the other embodiments.

Embodiment 4

In this embodiment, other examples of electronic devices that can include the power storage device described in Embodiment 1 or the like will be described.

Figure 20A:
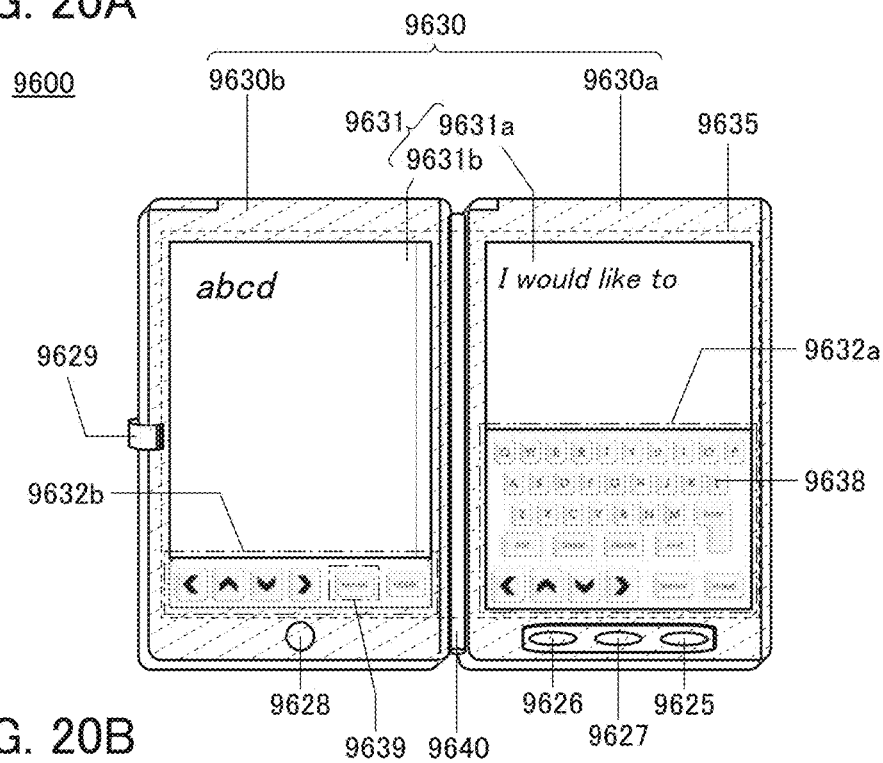
FIGS. 20A to 20C illustrate an example of an electronic device.
Figure 20B:
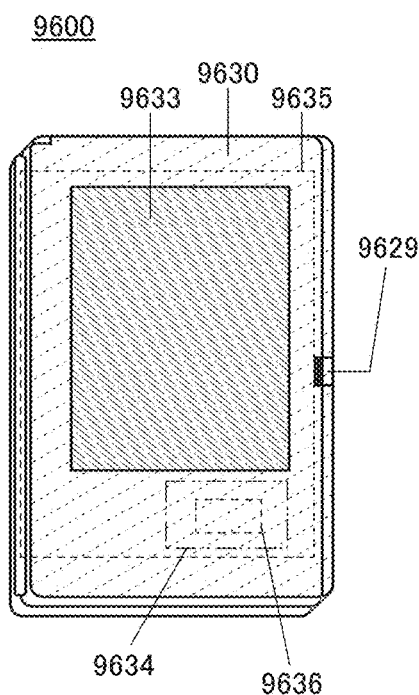

FIGS. 20A and 20B illustrate an example of a tablet terminal that can be folded in half. A tablet terminal 9600 illustrated in FIGS. 20A and 20B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 20A illustrates the tablet terminal 9600 that is opened, and FIG. 20B illustrates the tablet terminal 9600 that is closed.

The tablet terminal 9600 includes a power storage device 9635 inside the housings 9630a and 9630b. The power storage device 9635 is provided across the housings 9630a and 9630b, passing through the movable portion 9640.

Part of the display portion 9631a can be a touch panel region 9632a, and data can be input by touching operation keys 9638 that are displayed. Note that FIG. 20A shows, as an example, that half of the area of the display portion 9631a has only a display function and the other half of the area has a touch panel function. However, the structure of the display portion 9631a is not limited to this example, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, e.g., a gyroscope or an acceleration sensor, may be incorporated in the tablet terminal.

Although the display portion 9631a and the display portion 9631b have the same display area in FIG. 20A as an example, one embodiment of the present invention is not particularly limited to this example. The display portion 9631a and the display portion 9631b may have different areas or different display quality. For example, one of the display portions 9631a and 9631b may display higher definition images than the other.

The tablet terminal is closed in FIG. 20B. The tablet terminal includes a housing 9630, a solar cell 9633, and a charge and discharge control circuit 9634 including a DC-DC converter 9636. The power storage device of one embodiment of the present invention is used as the power storage device 9635.

The tablet terminal 9600 can be folded in two such that the housings 9630a and 9630b overlap with each other when not in use. Thus, the display portions 9631a and 9631b can be protected, which increases the durability of the tablet terminal 9600. In addition, the power storage device 9635 of one embodiment of the present invention has flexibility and can be repeatedly bent without a large decrease in charge and discharge capacity. Thus, a highly reliable tablet terminal can be provided.

The tablet terminal illustrated in FIGS. 20A and 20B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage device 9635 can be charged efficiently. The use of the power storage device of one embodiment of the present invention as the power storage device 9635 can inhibit a decrease in discharge capacity caused by repeated charge and discharge; thus, a tablet terminal that can be used over a long period of time can be provided.

Figure 20C:
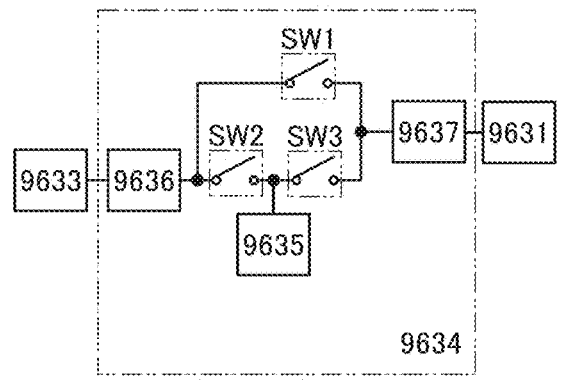

The structure and operation of the charge and discharge control circuit 9634 illustrated in FIG. 20B is described with reference to a block diagram of FIG. 20C. The solar cell 9633, the power storage device 9635, the DC-DC converter 9636, a converter 9637, switches SW1 to SW3, and the display portion 9631 are illustrated in FIG. 20C, and the power storage device 9635, the DC-DC converter 9636, the converter 9637, and the switches SW1 to SW3 correspond to the charge and discharge control circuit 9634 in FIG. 20B.

First, an example of operation in the case where electric power is generated by the solar cell 9633 using external light will be described. The voltage of electric power generated by the solar cell is raised or lowered by the DC-DC converter 9636 to a voltage for charging the power storage device 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage device 9635 can be charged.

Note that the solar cell 9633 is described as an example of a power generation means; however, one embodiment of the present invention is not limited to this example. The power storage device 9635 may be charged using another power generation means such as a piezoelectric element or a thermoelectric conversion element (Peltier element). For example, the power storage device 9635 may be charged with a non-contact power transmission module capable of performing charging by transmitting and receiving electric power wirelessly (without contact), or any of the other charge means used in combination.

Figure 21A:
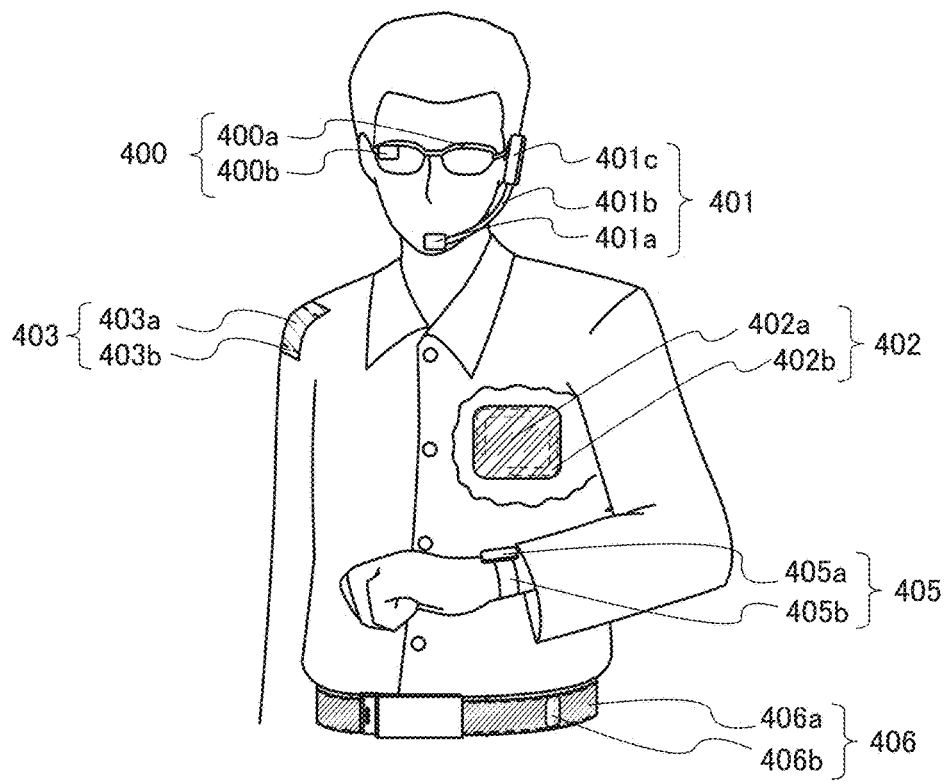
FIGS. 21A to 21C illustrate examples of electronic devices.
Figure 21B:
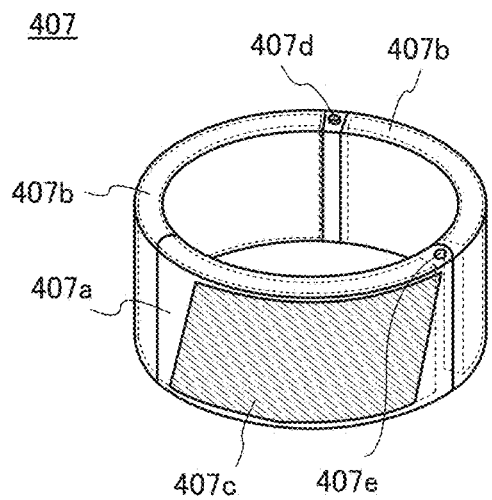
Figure 21C:
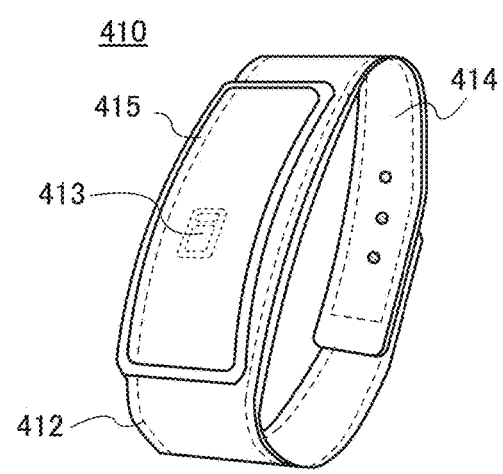

The power storage device described in Embodiment 1 or the like can be provided in wearable devices illustrated in FIGS. 21A to 21C.

For example, the power storage device can be provided in a glasses-type device 400 illustrated in FIG. 21A. The glasses-type device 400 includes a frame 400a and a display portion 400b. The power storage device is provided in a temple of the frame 400a having a curved shape, whereby the glasses-type device 400 can have a well-balanced weight and can be used continuously for a long time.

The power storage device can be provided in a headset-type device 401. The headset-type device 401 includes at least a microphone portion 401a, a flexible pipe 401b, and an earphone portion 401c. The power storage device can be provided in the flexible pipe 401b and the earphone portion 401c.

Furthermore, the power storage device can be provided in a device 402 that can be attached directly to a body. A power storage device 402b can be provided in a thin housing 402a of the device 402.

Furthermore, the power storage device can be provided in a device 403 that can be attached to clothes. A power storage device 403b can be provided in a thin housing 403a of the device 403.

Furthermore, the power storage device can be provided in a watch-type device 405. The watch-type device 405 includes a display portion 405a and a belt portion 405b, and the power storage device can be provided in the display portion 405a or the belt portion 405b.

Furthermore, the power storage device can be provided in a belt-type device 406. The belt-type device 406 includes a belt portion 406a and a wireless power feeding and receiving portion 406b, and the power storage device can be provided inside the belt portion 406a.

The power storage device described in Embodiment 1 can be provided in a wristband device 407 illustrated in FIG. 21B. The wristband device 407 includes two curved power storage devices 407*b* in a case 407*a*. A curved display portion 407*c* is provided over a surface of the case 407*a*. For the display portion that can be used for the display portion 407*c*, the description of the display portion in FIG. 19 can be referred to. The wristband device 407 includes a connection portion 407*d* and a hinge portion 407*e*. A portion between the connection portion 407*d* and the hinge portion 407*e* can be flexibly moved using the hinge portion 407*e* as an axis. Charging or the like through an external terminal provided in the connection portion 407*d* is also possible.

The power storage device described in the above embodiment can be provided in a wearable device 410 illustrated in FIG. 21C. The wearable device 410 includes a sensor portion 413, a display portion 415, and a band portion 414 and can be worn on a wrist or the like, for example. A curved power storage device 412 is provided in the band portion 414. For the display portion that can be used for the display portion 415, the description of a display portion in FIG. 22 to be made later can be referred to.

The power storage device described in the above embodiment is used as the power storage device 412; thus, even in the case where the power storage device 412 is changed in shape when the wearable device 410 is worn or removed, it is possible to reduce the possibility that, for example, a crack is generated in an exterior body. Accordingly, the wearable device 410 can be highly reliable.

Figure 22:
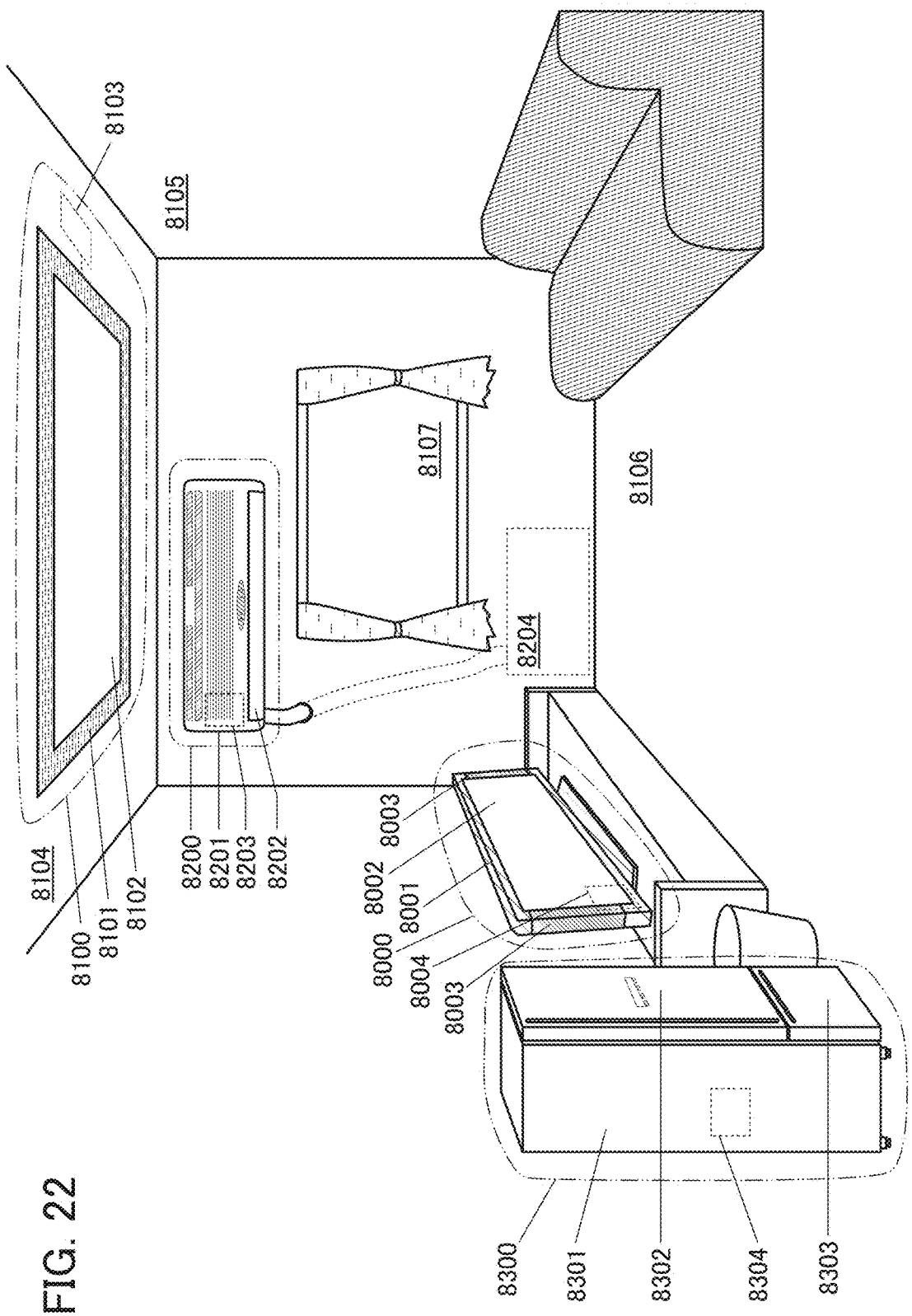
FIG. 22 illustrates examples of electronic devices.

FIG. 22 illustrates other examples of electronic devices. In FIG. 22, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 22, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 22 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Although FIG. 22 illustrates, as an example, the installation lighting device 8100 provided in the ceiling 8104, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 22, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 22 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage devices 8203 of one embodiment of the present invention as an uninterruptible power supply even when electric power cannot be supplied from a commercial power supply due to power failure or the like.

Although FIG. 22 illustrates, as an example, the split-type air conditioner including the indoor unit and the outdoor unit, the power storage device of one embodiment of the present invention can be used in an air conditioner in which the functions of an indoor unit and an outdoor unit are integrated in one housing.

In FIG. 22, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, the power storage device 8304, and the like. The power storage device 8304 is provided in the housing 8301 in FIG. 22. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

This embodiment can be implemented in appropriate combinations with any of the other embodiments.

Embodiment 5

In this embodiment, examples of vehicles each including the power storage device described in Embodiment 1 or the like will be described.

The use of power storage devices in vehicles can lead to next-generation clean energy vehicles such as hybrid electric vehicles (HEVs), electric vehicles (EVs), and plug-in hybrid electric vehicles (PHEVs).

Figure 23A:
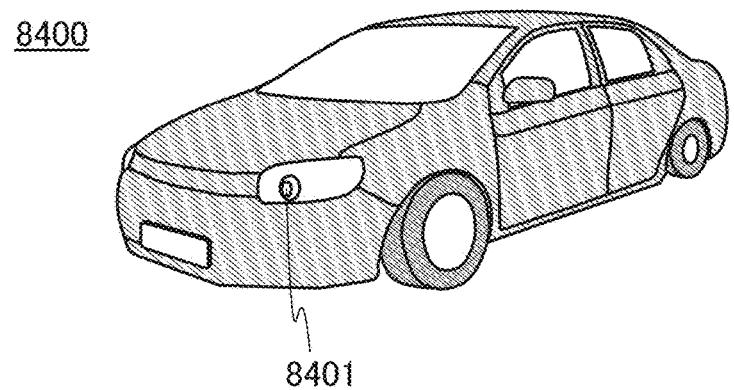
FIGS. 23A and 23B illustrate examples of electronic devices.
Figure 23B:
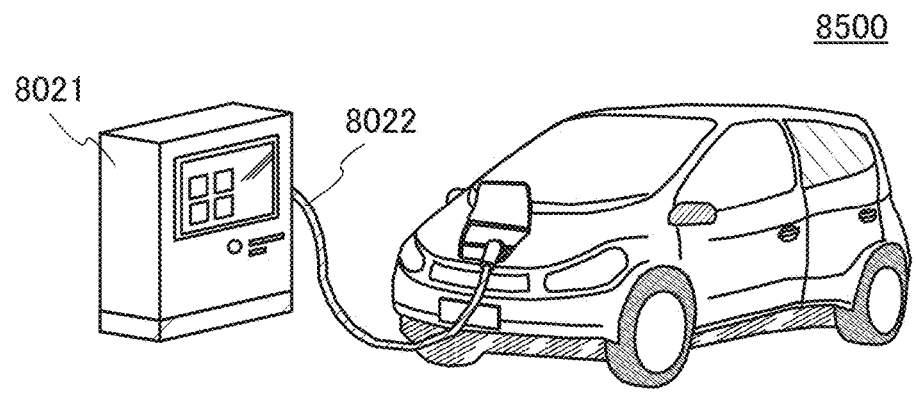

FIGS. 23A and 23B each illustrate an example of a vehicle using one embodiment of the present invention. An automobile 8400 illustrated in FIG. 23A is an electric vehicle which runs on the power of an electric motor. Alternatively, the automobile 8400 is a hybrid electric vehicle which runs on either the electric motor or an engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 23B illustrates an automobile 8500 including the power storage device. The automobile 8500 can be charged when the power storage device is supplied with electric power from external charging equipment by a plug-in method, a contactless power feeding method, or the like. In FIG. 23B, the power storage device included in the automobile 8500 is charged with the use of a ground-based charging apparatus 8021 through a cable 8022. In charging, a given method may be employed as a charging method, the standard of a connector, or the like as appropriate. The charging apparatus 8021 may be a charging station provided in a commerce facility or a power source in a house. For example, with the use of a plug-in technique, the power storage device included in the automobile 8500 can be charged by being supplied with electric power from outside, for example. The charging can be performed by converting AC electric power into DC electric power through a converter such as an AC-DC converter.

Furthermore, although not illustrated, the vehicle may include a power receiving device so as to be charged by being supplied with electric power from an above-ground power transmitting device in a contactless manner. In the case of the contactless power feeding method, by fitting a power transmitting device in a road or an exterior wall, charging can be performed not only while the vehicle is stopped but also while the vehicle is moving. In addition, the contactless power feeding method may be utilized to perform transmission and reception of electric power between vehicles. Furthermore, a solar cell may be provided in the exterior of the vehicle to charge the power storage device while the vehicle is stopped or is moving. To supply electric power in such a contactless manner, an electromagnetic induction method or a magnetic resonance method can be used.

Furthermore, the power storage device included in the vehicle can be used as a power source for supplying electric power to products other than the vehicle. In such a case, the use of a commercial power source can be avoided at peak time of electric power demand.

This embodiment can be implemented in appropriate combinations with any of the other embodiments.

EXPLANATION OF REFERENCE

100*a*: stack, 100*b*: stack, 100*c*: stack, 100*d*: stack, 101: negative electrode current collector, 102: negative electrode active material layer, 103: separator, 104: positive electrode active material layer, 105: positive electrode current collector, 107: electrolytic solution, 110: power storage device, 111: film, 112: film, 113: film, 115: lead electrode, 116: exterior body, 117: inner structure, 200: thin film, 210: power storage device, 400: glass-type device, 400*a*: frame, 400*b*: display portion, 401: headset-type device, 401*a*: microphone portion, 401*b*: flexible pipe, 401*c*: earphone portion, 402: device, 402*a*: housing, 402*b*: power storage device, 403: device, 403*a*: housing, 403*b*: power storage device, 405: watch-type device, 405*a*: display portion, 405*b*: belt portion, 406: belt-type device, 406*a*: belt portion, 406*b*: wireless power feeding and receiving portion, 407: wristband device, 407*a*: case, 407*b*: power storage device, 407*c*: display portion, 407*d*: connection portion, 407*e*: hinge portion, 410: wearable device, 412: power storage device, 413: sensor portion, 414: band portion, 415: display portion, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 510: positive electrode tab electrode, 511: negative electrode tab electrode, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 2100: storage battery, 2103: separator, 2103*a*: region, 2103*b*: region, 2107: exterior body, 2111: positive electrode, 2111*a*: positive electrode, 2113: negative electrode, 2115: negative electrode, 2115*a*: negative electrode, 2120: sealing layer, 2121: positive electrode lead, 2125: negative electrode lead, 2130: electrode assembly, 2131: electrode assembly, 2200: storage battery, 7100: portable display device, 7101: housing, 7102: display portion, 7103: operation button, 7104: power battery, 7300: armband device, 7301: arm, 7400: mobile phone, 7401: housing, 7402: display portion, 7403: operation button, 7404: external connection port, 7405: speaker, 7406: microphone, 7407: storage battery, 8000: display device, 8001: housing, 8002: display portion, 8003: speaker portion, 8004: power storage device, 8021: charging apparatus, 8022: cable, 8100: lighting device, 8101: housing, 8102: light source, 8103: power storage device, 8104: ceiling, 8105: wall, 8106: floor, 8107: window, 8200: indoor unit, 8201: housing, 8202: air inlet, 8203: power storage device, 8204: outdoor unit, 8300: electric refrigerator-freezer, 8301: housing, 8302: refrigerator door, 8303: freezer door, 8304: power storage device, 8400: automobile, 8401: headlight, 8500: automobile, 9600: tablet terminal, 9625: switch, 9626: switch, 9627: power switch, 9628: operation switch, 9629: fastener, 9630: housing, 9630*a*: housing, 9630*b*: housing, 9631: display portion, 9631*a*: display portion, 9631*b*: display portion, 9632*a*: region, 9632*b*: region, 9633: solar cell, 9634: charge and discharge control circuit, 9635: power storage device, 9636: DC-DC converter, 9637: converter, 9638: operation key, 9639: button, and 9640: movable portion.

This application is based on Japanese Patent Application serial no. 2015-120997 filed with Japan Patent Office on Jun. 16, 2015, the entire contents of which are hereby incorporated by reference.

The invention claimed is:

1. A power storage device comprising:
an inner structure; and
an exterior body surrounding the inner structure,
wherein the inner structure comprises a positive electrode and a negative electrode, and
wherein the exterior body comprises a first film containing an alloy comprising one of Ti—Nb—Ta—Zr—O and Ti—Ta—Nb—V—Zr—O.

2. The power storage device according to claim 1, further comprising an electrolytic solution surrounded by the exterior body.

3. The power storage device according to claim 1, wherein the first film further contains one or more elements selected from molybdenum, chromium, and aluminum.

4. The power storage device according to claim 1, wherein the first film comprises a region with a thickness of more than or equal to 10 μm and less than or equal to 150 μm.

5. The power storage device according to claim 1, wherein the first film comprises a region with a density of more than or equal to 5 g/cm$^3$ and less than or equal to 6 g/cm$^3$.

6. The power storage device according to claim 1,
wherein the exterior body further comprises a second film in contact with the first film, and
wherein the second film contains an organic material.

7. The power storage device according to claim 6,
wherein the exterior body further comprises a third film in contact with the first film,
wherein the third film contains an organic material, and
wherein the first film is between the second film and the third film.

8. The power storage device according to claim 1, wherein the exterior body is flexible.

9. An electronic device comprising:
the power storage device according to claim 1;
a display; and
an operation button.

10. A power storage device comprising:
an inner structure; and
an exterior body surrounding the inner structure,
wherein the inner structure comprises a plurality of stacks, and
wherein the exterior body comprises a first film containing an alloy comprising one of Ti—Nb—Ta—Zr—O and Ti—Ta—Nb—V—Zr—O.

11. The power storage device according to claim 10, wherein each stack includes a negative electrode current collector, a negative electrode active material layer, a separator, a positive electrode active material layer, and a positive electrode current collector.

12. The power storage device according to claim 10, further comprising an electrolytic solution surrounded by the exterior body.

13. The power storage device according to claim 10, wherein the first film further contains one or more elements selected from molybdenum, chromium, and aluminum.

14. The power storage device according to claim 10, wherein the first film comprises a region with a thickness of more than or equal to 10 μm and less than or equal to 150 μm.

15. The power storage device according to claim 10, wherein the first film comprises a region with a density of more than or equal to 5 g/cm$^3$ and less than or equal to 6 g/cm$^3$.

16. The power storage device according to claim 10,
wherein the exterior body further comprises a second film in contact with the first film, and
wherein the second film contains an organic material.

17. The power storage device according to claim 16,
wherein the exterior body further comprises a third film in contact with the first film,
wherein the third film contains an organic material, and
wherein the first film is between the second film and the third film.

18. The power storage device according to claim 10, wherein the exterior body is flexible.

19. An electronic device comprising:
the power storage device according to claim 10;
a display; and
an operation button.

20. The power storage device according to claim 1,
wherein the exterior body further comprises a flexible thin film in contact with the first film, and
wherein the flexible thin film comprises at least one of aluminum, stainless steel, copper, nickel, and a graphene compound.

21. The power storage device according to claim 1, wherein the power storage device is flexible.

22. The power storage device according to claim 10,
wherein the exterior body further comprises a flexible thin film in contact with the first film, and
wherein the flexible thin film comprises at least one of aluminum, stainless steel, copper, nickel, and a graphene compound.

23. The power storage device according to claim 10, wherein the power storage device is flexible.

* * * * *